(12) United States Patent
Osanai

(10) Patent No.: US 8,768,576 B2
(45) Date of Patent: Jul. 1, 2014

(54) UNDAZZLED-AREA MAP PRODUCT, AND SYSTEM FOR DETERMINING WHETHER TO DAZZLE PERSON USING THE SAME

(75) Inventor: Satoshi Osanai, Kariya (JP)

(73) Assignee: Denso Corporation, Kariya (JP)

(*) Notice: Subject to any disclaimer, the term of this patent is extended or adjusted under 35 U.S.C. 154(b) by 31 days.

(21) Appl. No.: 13/611,090

(22) Filed: Sep. 12, 2012

(65) Prior Publication Data
US 2013/0006480 A1 Jan. 3, 2013

Related U.S. Application Data

(62) Division of application No. 12/384,302, filed on Apr. 2, 2009, now abandoned.

(30) Foreign Application Priority Data

Apr. 2, 2008 (JP) ................. 2008-096196
Jul. 30, 2008 (JP) ................. 2008-196653

(51) Int. Cl.
*B60Q 1/076* (2006.01)
*B60Q 1/14* (2006.01)

(52) U.S. Cl.
CPC .......... *B60Q 1/143* (2013.01); *B60Q 2300/054* (2013.01); *B60Q 2300/056* (2013.01); *B60Q 2300/134* (2013.01); *B60Q 2300/312* (2013.01); *B60Q 2300/41* (2013.01); *B60Q 2300/42* (2013.01); *B60Q 2300/45* (2013.01)
USPC .......................................... 701/49; 362/466

(58) Field of Classification Search
CPC ............. B60Q 1/143; B60Q 2300/054; B60Q 2300/056; B60Q 2300/134; B60Q 2300/312; B60Q 2300/41; B60Q 2300/42; B60Q 2300/45

USPC ..................................... 701/49; 362/465, 466
See application file for complete search history.

(56) References Cited

U.S. PATENT DOCUMENTS 6,572,248 B2 * 6/2003 Okuchi et al. ................. 362/464
6,993,255 B2 * 1/2006 Braun et al. .................... 396/61
(Continued)

FOREIGN PATENT DOCUMENTS

| JP | 04-081337 | 3/1992 |
| JP | 10-151987 | 6/1998 |

(Continued)

OTHER PUBLICATIONS

Office Action dated Dec. 21, 2010, in corresponding Japanese Application No. 2008-196653, with English translation thereof.

(Continued)

*Primary Examiner* — Kevin Hurley
(74) *Attorney, Agent, or Firm* — Harness, Dickey & Pierce, PLC

(57) ABSTRACT

In an undazzled-area map product stored in a computer-readable storage unit, information indicative of a relationship between a boundary distance and each of a plurality of divided sections of a rectangular area to be picked up by a pickup unit is included. The pickup unit is provided in a reference vehicle with a headlight and working to pick up an image of the rectangular area ahead of the reference vehicle. The boundary distance is defined as a maximum distance between the reference vehicle and a target person such that, when a distance between the reference vehicle and the target person is within the maximum distance, the target person is estimated to be undazzled by the headlight of the reference vehicle.

10 Claims, 16 Drawing Sheets

(56) References Cited

U.S. PATENT DOCUMENTS

| | | | |
|---|---|---|---|
| 7,195,379 B2* | 3/2007 | Shaffer | 362/465 |
| 7,810,970 B2 | 10/2010 | Ishiguro | |
| 2002/0039294 A1 | 4/2002 | Okuchi et al. | |
| 2003/0137849 A1 | 7/2003 | Alden | |
| 2003/0193981 A1 | 10/2003 | Matveev | |
| 2004/0052083 A1* | 3/2004 | Daicho et al. | 362/466 |
| 2004/0114381 A1* | 6/2004 | Salmeen et al. | 362/465 |
| 2006/0023461 A1 | 2/2006 | Knight | |
| 2008/0130302 A1* | 6/2008 | Watanabe | 362/466 |
| 2008/0144326 A1* | 6/2008 | Watanabe | 362/466 |
| 2008/0239735 A1 | 10/2008 | Ishiguro | |
| 2009/0086497 A1* | 4/2009 | Kamioka et al. | 362/466 |
| 2009/0190323 A1* | 7/2009 | Watanabe et al. | 362/37 |
| 2009/0279317 A1* | 11/2009 | Tatara | 362/465 |

FOREIGN PATENT DOCUMENTS

| | | |
|---|---|---|
| JP | 2002-104064 | 4/2002 |
| JP | 2004-161082 | 6/2004 |
| JP | 2005-092861 | 4/2005 |
| JP | 2005-329819 | 12/2005 |
| JP | 2008-094127 | 4/2008 |

OTHER PUBLICATIONS

J. Mashiko, et al., "Analysis of potential glare from an AFS, which may affect oncoming vehicles drivers", 2002 research meetings by National Traffic Safety and Environment Laboratory; pp. 79-84 (w/ partial English translation).

T. Okada, et al., "Analysis of potential glare from an AFS, which may affect oncoming vehicles drivers (Second Report)", 2003 research meetings by National Traffic Safety and Environment Laboratory; pp. 79-84 (w/ partial English translation).

J. Mashiko, et al., "Analysis of potential glare from an AFS, which may affect oncoming vehicles drivers (Third Report)", 2003 research meetings by National Traffic Safety and Environment Laboratory (w/ partial English translation).

* cited by examiner

| INPUT FILE ( LIGHT DISTRIBUTION DATA ) | |
|---|---|
| BEAM TYPE | LOW/HIGH BEAM |
| BEAM POSITION | LEFT/RIGHT |
| MEASUREMENT DISTANCE ( m ) | R |
| MINIMUM ELEVATION ANGLE ( deg. ) | $\alpha_{MIN}$ |
| MAXIMUM ELEVATION ANGLE ( deg. ) | $\alpha_{MAX}$ |
| STEP ANGLE ( deg. ) | $\Delta\alpha\,(\Delta\beta)$ |
| MINIMUM YAW ANGLE ( deg. ) | $\beta_{MIN}$ |
| MAXIMUM YAW ANGLE ( deg. ) | $\beta_{MAX}$ |
| BRIGHTNESS DATA ( cd/m² ) | $A_{\alpha\beta}$ |

FIG.4A

| TARGET-DRIVER'S ILLUMINATION PARAMETERS | | |
|---|---|---|
| LANE WIDTH ( mm ) | | $W_{ROAD}$ |
| OFFSET WIDTH (mm ) | | $W_{OFFS}$ |
| REFERENCE VEHICLE | HIGH-BEAM LAMP : WIDTH (mm ) | $W_{LA}$ |
| | HIGH-BEAM LAMP : HEIGHT (mm ) | $H_{LA}$ |
| | LOW-BEAM LAMP : WIDTH (mm ) | $W_{LB}$ |
| | LOW-BEAM LAMP : HEIGHT (mm ) | $H_{LB}$ |
| | CAMERA HEIGHT (mm ) | $H_{CM}$ |
| | HEIGHT COEFFICIENT | K |
| TARGET VEHICLE | EYE-POINT HEIGHT (mm ) | $H_{EP}$ |
| | LIGHT TRANSMISSION OF WINDSHIELD | $\tau$ |

FIG.4B

| CONSTANTS FOR CALCULATION OF EVALUATION VALUE | |
|---|---|
| ADAPTATION LUMINANCE ( $cd/m^2$ ) | Lu |
| CONSTANT ( $lx/min^{0.45}$ ) | $C_{pD0}$ |
| CONSTANT ( $cd/m^2$ ) | CpL |

FIG.4C

| FIRST OUTPUT DEFINING PARAMETERS | |
|---|---|
| RANGE OF ELEVATION ANGLE ( deg ) | $-\theta x_{LIM} \sim \theta x_{LIN}$ |
| STEP ANGLE ( deg ) | $\Delta\theta x$ |
| RANGE OF YAE ANGLE (deg ) | $-\theta y_{LIM} \sim \theta y_{LIN}$ |
| STEP ANGLE ( deg ) | $\Delta\theta y$ |

FIG.4D

| SECOND OUTPUT DEFINING PARAMETERS | |
|---|---|
| FOCAL LENGTH ( mm ) | f |
| IMAGE SENSOR SIZE | $W_{EL} \times H_{EL}$ |
| IMAGE SIZE ( PIXELS ) | $W_{PX} \times H_{PX}$ |

FIG.5A

| OUTPUT FILE (FIRST OUTPUT DEFINING PARAMETERS) | | | | |
|---|---|---|---|---|
| | | \multicolumn{3}{c}{RANGE OF YAW ANGLE} | | |
| | | -30 | -29.5 | -29 |
| RANGE OF ELEVATION ANGLE | -10 | 47 | 48 | 49 |
| | -9.5 | 48 | 49 | 50 |
| | -9 | 48 | 49 | 51 |
| | -8.5 | 49 | 50 | 52 |
| | -8 | 51 | 51 | 52 |
| | -7.5 | 53 | 53 | 54 |
| | -7 | 54 | 55 | 55 |
| | -6.5 | 55 | 55 | 56 |
| | -6 | 56 | 57 | 58 |

FIG.5B

| OUTPUT FILE (SECOND OUTPUT DEFINING PARAMETERS) | | | | |
|---|---|---|---|---|
| | | | WIDTH | |
| | | -376 | -375 | -374 |
| HEIGHT | -240 | 20 | 20 | 20 |
| | -239 | 20 | 20 | 20 |
| | -238 | 20 | 20 | 20 |
| | -237 | 20 | 20 | 20 |
| | -236 | 20 | 20 | 21 |
| | -235 | 20 | 20 | 21 |
| | -234 | 20 | 20 | 21 |
| | -233 | 20 | 20 | 21 |
| | -232 | 20 | 20 | 21 |

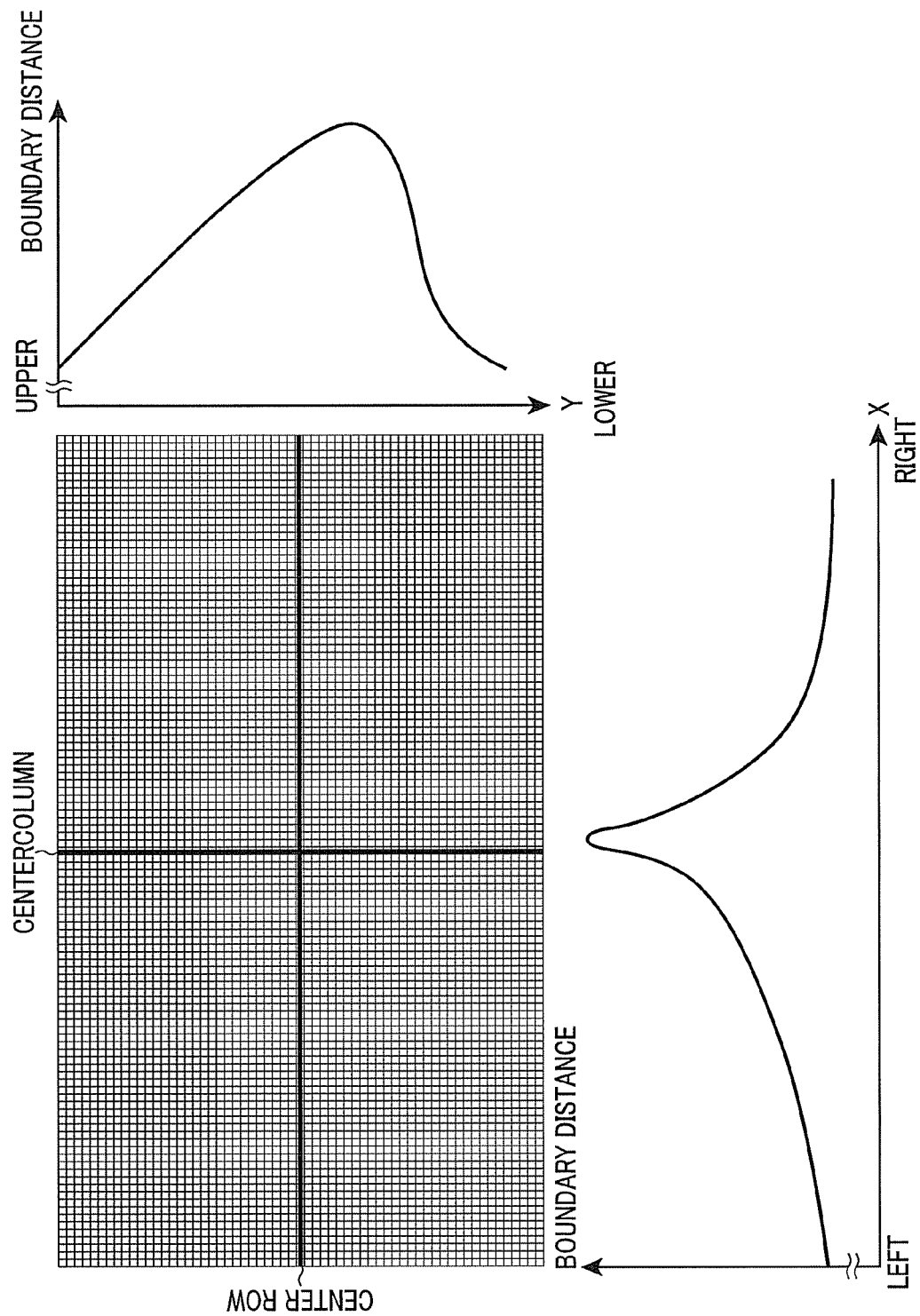

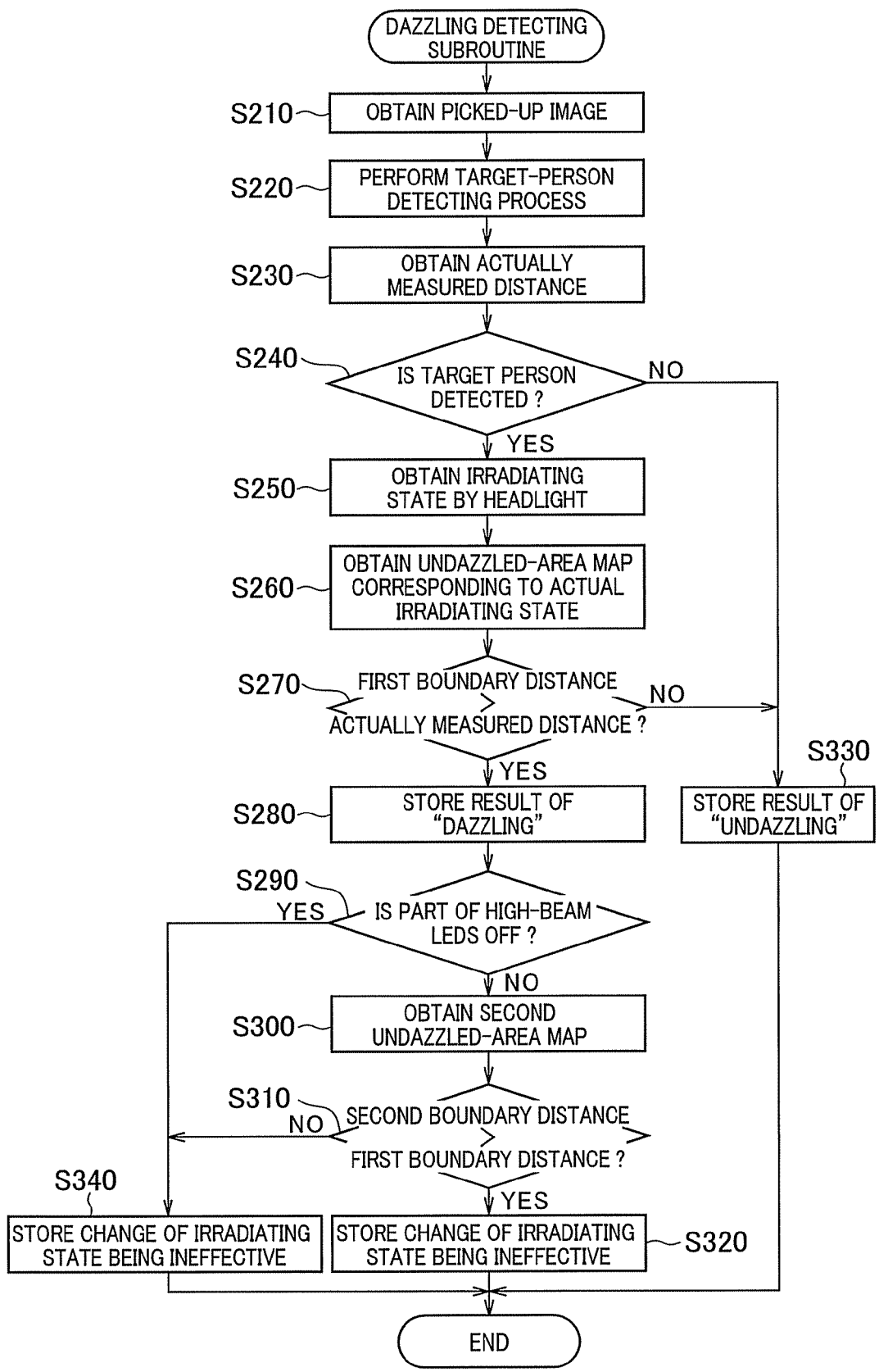

UNDAZZLED-AREA MAP PRODUCT, AND SYSTEM FOR DETERMINING WHETHER TO DAZZLE PERSON USING THE SAME

CROSS REFERENCE TO RELATED APPLICATIONS

This application is a divisional of U.S. patent application Ser. No. 12/384,302 filed on Apr. 2, 2009. This application claims the benefit and priority of Japanese Patent Applications 2008-096196 and 2008-196653 filed on Apr. 2, 2008 and Jul. 30, 2008, respectively. The entire disclosures of each of the above applications are incorporated herein by reference.

FIELD OF THE INVENTION

The present invention relates to undazzled-area map products embedded in a computer-readable storage unit and usable by, for example, an AFS (Adaptive Front-lighting System), and systems for determining whether to dazzle a person using such an undazzled-area map product. The AFS is installed in a vehicle and designed to adjust the light distribution of a headlight of the vehicle according to the form of roads and/or the running condition of the vehicle.

BACKGROUND OF THE INVENTION

Light distribution control systems, which are disclosed in Japanese Patent Application Publication No. 2004-161082, are conventionally used to be installed in vehicles.

A light distribution control system disclosed in the Patent Application Publication installed in a vehicle to be controlled is designed to detect values of various parameters associated with physical relationships between the controlled vehicle and either a preceding vehicle or an oncoming vehicle. The "preceding vehicle or oncoming vehicle" will also be referred to as "target vehicle" hereinafter.

The various parameters include the width of the target vehicle, a relative angle between the displayed target vehicle and a reference direction of the controlled vehicle, and a relative distance therebetween. The various parameters also include the speed and a steering position of the controlled vehicle.

According to the detected values of the various parameters, the light distribution control system is designed to individually control the intensity of a beam generated by the headlights of the controlled vehicle and to limit the change of the orientation of the optical axis of each headlight in a vertical direction and a horizontal direction. This aims at preventing the driver of the target vehicle from being dazzled, in other words, from suffering discomfort due to glare.

Such a light distribution control system carries out light-distribution control without quantitatively determining which level of glare the driver of the target vehicle perceives. For this reason, it may unnecessarily limit the change of the orientation of the optical axis of each headlight, and otherwise poorly limit it.

The unnecessary limitation of the change of the orientation of the optical axis of each headlight may cause the visibility of the driver of the controlled vehicle to be more restricted than required.

In addition, the poor limitation of the change of the orientation of the optical axis of each headlight may cause the driver of the target vehicle to become uncomfortable. Note that the controlled vehicle in which such a light distribution control system is installed will be also referred to as "reference vehicle" hereinafter.

From this viewpoint, using, for the light-distribution control, an evaluation value W indicative of the level of glare to be perceived by the driver of the target vehicle has been studied; this evaluation value W is calculated with the use of the following Schmidt-Clausen and Bindels equation [1]:

$$W = 5.0 - 2\log \sum \frac{E_{Bi}}{C_{p00}\left[1 + \sqrt{\frac{L_u}{C_{pL}}}\right](\theta_i \cdot 60)^{0.46}} \quad [1]$$

where:

$E_{Bi}$ represents illumination directed toward the target-vehicle driver's eye from i-th headlamp of the reference vehicle;

$\theta_i$ represents an angle formed by the target-vehicle driver's line of sight and the optical axis of i-th headlamp of the reference vehicle;

$L_u$ represents adaptation luminance of the driver of the target vehicle;

$C_{p00}$ represents a constant;

$C_{pL}$ represents a constant; and i represents an identifier of any one of the headlamps of the headlights On this Schmidt-Clausen and Bindels equation [1], see J. Mashiko, K. Morita, T. Okada, and M. Sekine, "*Analysis of adaptive front-lighting system on glare perceived by oncoming drivers*", in proceedings of 2002 research meetings by National Traffic Safety and Environment Laboratory, pp. 79 to 199.

Specifically, comparison of the evaluation value W with deBoer discomfort rating illustrated in the following table 1 obtains that the driver of the target vehicle would feel discomfort due to glare when the evaluation value W is equal to or lower than the rating of 4.

TABLE 1

| deBoer Discomfort Rating | |
|---|---|
| 1 | Unbearable |
| 2 | |
| 3 | Disturbing |
| 4 | |
| 5 | Just admissible |
| 6 | |
| 7 | Acceptable |
| 8 | |
| 9 | Noticeable |

For this reason, execution of the light-distribution control to provide the evaluation value W greater than the rating of 4 has been studied.

However, calculation of the evaluation value W requires the values of the various parameters, such as the illumination $E_{Bi}$ and the angle $\theta_i$ every time the physical relationships between the reference vehicle and the target vehicle vary.

Particularly, the headlights of the reference vehicle are located on each side of the front end thereof. The headlights are commonly equipped with the first pair of high-beam headlamps and the second pair of low-beam headlamps. The high-beam headlamps are used when the reference vehicle runs on a road where there is no traffic, and the second pair of low-beam headlamps are used when there are target vehicles.

For this reason, calculation of the value of each of the various parameters, such as the illumination $E_{Bi}$ and the angle $\theta_i$, for each of the headlamps is needed. This may take a lot of time and processing load, making it difficult to carry out, in real time, the light-distribution control based on the evaluation value W.

SUMMARY OF THE INVENTION

In view of the circumstances set force above, an object of an aspect of the present invention is to provide techniques installed in a reference vehicle; these techniques are configured to carry out, in real time, proper light-distribution control without unnecessarily limiting the view of the driver of the reference vehicle.

According to one aspect of the present invention, there is provided an undazzled-area map product stored in a computer-readable storage unit. The undazzled-area map product includes information indicative of a relationship between a boundary distance and each of a plurality of divided sections of a rectangular area to be picked up by a pickup unit. The pickup unit is provided in a reference vehicle with a headlight and working to pick up an image of the rectangular area ahead of the reference vehicle. The boundary distance is defined as a maximum distance between the reference vehicle and a target person such that, when a distance between the reference vehicle and the target person is within the maximum distance, the target person is estimated to be undazzled by the headlight of the reference vehicle.

In a preferred embodiment of the one aspect of the present invention, the target person is a driver of a target vehicle, the target vehicle is any one of a vehicle that the reference vehicle follows and a vehicle oncoming toward the reference vehicle, and the boundary distance is defined as the maximum distance between the reference vehicle and the target vehicle such that, when the distance between the reference vehicle and the target vehicle is within the maximum distance, the driver of the target vehicle is estimated to be undazzled by the headlight of the reference vehicle. According to another aspect of the present invention, there is provided a method for producing an undazzled-area map according to the preferred embodiment, the method includes:

(a) setting one of the plurality of divided sections as a target section and one of a plurality of preset inter-vehicle distances between the reference vehicle and the target vehicle as a specified inter-vehicle distance;

(b) calculating an angle formed by a line of the target-vehicle's driver of sight and an optical axis of the headlight of the reference vehicle when an eye-point of the driver of the target vehicle is assumed to be located at the target section and the target vehicle is located at the specified inter-vehicle distance from the reference vehicle;

(c) calculating an illumination directed toward the eye-point of the driver of the target vehicle from the headlight of the reference vehicle;

(d) calculating, based on the calculated angle and illumination, an evaluation value indicative of a level of glare to be perceived by the driver of the target vehicle in accordance with a Schmidt-Clausen and Bindels equation while any one of the plurality of preset inter-vehicle distances is sequentially selected as the specified inter-vehicle distance;

(e) extracting, as a boundary distance for the target section, a maximum inter-vehicle distance from the plurality of preset inter-vehicle distances, the evaluation value corresponding to the extracted maximum inter-vehicle distance being less than a preset threshold value;

(f) repeatedly carrying out the steps (a) to (e) while changing selection of one of the plurality of divided sections as the target section until the boundary distance is extracted for each of the plurality of divided sections; and (g) producing the undazzled-area map by associating the boundary distance for each of the plurality of divided sections with each of the plurality of divided sections.

According to a further aspect of the present invention, there is provided a system for producing an undazzled-area map according to the preferred embodiment, the system includes an input unit configured to input a plurality of parameters. The plurality of parameters defining a positional relationship between an eye-point of the driver of the target vehicle and the headlight of the reference vehicle. The system includes a storing unit configured to store therein light-distribution data for the headlight of the reference vehicle. The light-distribution data represents a location of the headlight in a three-dimensional space and an illumination at the location. When one of the plurality of divided sections is set as a target section, one of a plurality of preset inter-vehicle distances between the reference vehicle and the target vehicle is set as a specified inter-vehicle distance, and an eye-point of the driver of the target vehicle is assumed to be located at the target section and the target vehicle is located at the specified inter-vehicle distance from the reference vehicle, the system includes a calculating unit configured to: calculate an angle formed by a line of the target-vehicle's driver of sight and an optical axis of the headlight of the reference vehicle;

calculate an illumination directed toward the eye-point of the driver of the target vehicle from the headlight of the reference vehicle;

calculate, based on the calculated angle and illumination, an evaluation value indicative of a level of glare to be perceived by the driver of the target vehicle in accordance with a Schmidt-Clausen and Bindels equation while any one of the plurality of preset inter-vehicle distances is sequentially selected as the specified inter-vehicle distance; and extract, as a boundary distance for the target section, a maximum inter-vehicle distance from the plurality of preset inter-vehicle distances, the evaluation value corresponding to the extracted maximum inter-vehicle distance being less than a preset threshold value. The system includes an executing unit configured to cause the calculating unit to repeatedly execute the calculations and the extraction while changing selection of one of the plurality of divided sections as the target section until the boundary distance is extracted for each of the plurality of divided sections. The system includes a producing unit configured to produce the undazzled-area map by associating the boundary distance for each of the plurality of divided sections with each of the plurality of divided sections.

According to a still further aspect of the present invention, there is provided a dazzling determining system installed in a vehicle to be controlled for determining whether a headlight of the controlled vehicle dazzles a target person. A pickup unit is installed in the controlled vehicle and configured to pick up an image of a rectangular area defined ahead of the controlled vehicle. The dazzling determining system includes an extracting unit working to extract a location of the target person in the image picked up by the pickup unit, and a distance measuring unit working to actually measure a distance between the controlled vehicle and the target person. The dazzling determining system includes a first undazzled-area map storage unit working to store therein a first undazzled-area map, the first undazzled-area map including information indicative of a relationship between a boundary distance and each of a plurality of divided sections of the rectangular area of the pickup unit. The boundary distance is defined as a maximum distance between the reference vehicle and the target person such that, when the actually measured distance between the reference vehicle and the target person is within the maximum distance, the target person is estimated to be undazzled by the headlight of the controlled vehicle. The dazzling determining system includes a first boundary distance extracting unit working to reference the first undazzled-area map to thereby extract, as a first boundary distance, the boundary distance corresponding to one of the plurality of divided sections. The one of the plurality of divided sections corresponds to the location of the target person. The dazzling determining system includes a dazzling determining unit working to compare the first boundary distance with the actually measured distance to thereby determine that the headlight of the controlled vehicle is estimated to dazzle the target person when the actually measured distance is equal to or lower than the first boundary distance.

According to a still further aspect of the present invention, there is provided a program product embedded in a media accessible by a computer of a system installed in a vehicle to be controlled for determining whether a headlight of the controlled vehicle dazzles a target person. A pickup unit is installed in the controlled vehicle and configured to pick up an image of a rectangular area defined ahead of the controlled vehicle. The system includes an extracting unit working to extract a location of the target person in the image picked up by the pickup unit, a distance measuring unit working to actually measure a distance between the controlled vehicle and the target person, and a first undazzled-area map storage unit working to store therein a first undazzled-area map. The first undazzled-area map includes information indicative of a relationship between a boundary distance and each of a plurality of divided sections of the rectangular area of the pickup unit. The boundary distance is defined as a maximum distance between the reference vehicle and the target person such that, when the actually measured distance between the reference vehicle and the target person is within the maximum distance, the target person is estimated to be undazzled by the headlight of the controlled vehicle. The program product includes first means for instructing the computer to reference the first undazzled-area map to thereby extract, as a first boundary distance, the boundary distance corresponding to one of the plurality of divided sections. The one of the plurality of divided sections corresponds to the location of the target person. The program product includes second means for instructing the computer to compare the first boundary distance with the actually measured distance to thereby determine that the headlight of the controlled vehicle is estimated to dazzle the target person when the actually measured distance is equal to or lower than the first boundary distance.

According to a still further aspect of the present invention, there is provided a system for controlling a headlight of a vehicle to be controlled. The system includes the dazzling determining system according to the still further aspect, and an adjuster configured to adjust at least one of a light quantity and an light irradiating region of the headlight so as to reduce a light quantity at the location of the target person when it is determined that the headlight of the controlled vehicle is estimated to dazzle the target person by the dazzling determining system.

According to a still further aspect of the present invention, there is provided a system for controlling a headlight of a vehicle to be controlled. The system includes the dazzling determining system according to the still further aspect. The dazzling determining system works to, when it is determined that the headlight of the controlled vehicle dazzles the target person, determine whether change of an actual irradiating state of the headlight of the controlled vehicle to an alternative irradiating state thereof reduces the level of glare for the target person. The system includes an adjuster configured to adjust the actual irradiating state of the headlight to the alternative irradiating state when it is determined that change of the actual irradiating state of the headlight of the controlled vehicle to the alternative irradiating state thereof reduces the level of glare for the target person.

BRIEF DESCRIPTION OF THE DRAWINGS

Other objects and aspects of the invention will become apparent from the following description of embodiments with reference to the accompanying drawings in which:

FIG. 4A is a view schematically illustrating target-driver's illumination parameters in table format according to the first embodiment;

FIG. 4B is a view schematically illustrating constants for calculation of an evaluation value according to the first embodiment;

FIG. 4C is a view schematically illustrating first output defining parameters in table format according to the first embodiment;

FIG. 4D is a view schematically illustrating second output defining parameters in table format according to the first embodiment;

FIG. 5A is a view schematically illustrating a part of an undazzled-area map to be produced by a processor of the undazzled-area map producing system based on the first output defining parameters in table format;

FIG. 5B is a view schematically illustrating a part of an undazzled-area map to be produced by the processor based on the second output defining parameters in table format;

FIG. 10 is a view schematically illustrating an undazzled-area map according to the second embodiment;

FIG. 16 is a flowchart schematically illustrating a dazzling detecting subroutine of the headlight control routine illustrated in FIG. 15.

DETAILED DESCRIPTION OF EMBODIMENTS OF THE INVENTION

Figure 1:
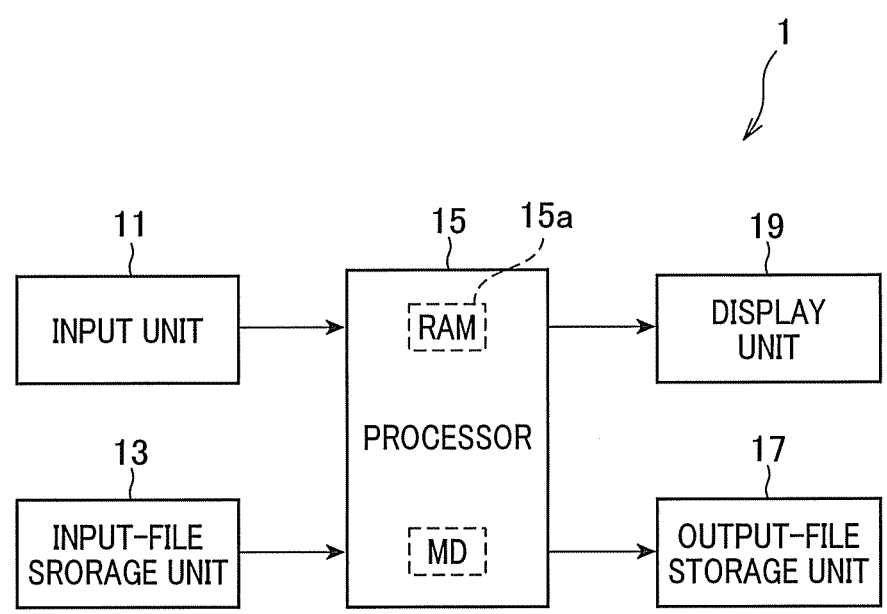
FIG. 1 is a block diagram schematically illustrating an example of the overall structure of an undazzled-area map producing system according to the first embodiment of the present invention.

Embodiments of the present invention will be described hereinafter with reference to the accompanying drawings. In the drawings, identical reference characters are utilized to identify identical corresponding components.

First Embodiment

Referring to FIG. 1, there is illustrated an example of the overall structure of an undazzled-area map producing system 1 according to the first embodiment of the present invention.

Note that, in the first embodiment, a vehicle running or temporally halting in a lane of a road in which a camera for picking up images in front thereof is installed will be referred to as "reference vehicle", and a vehicle that the reference vehicle follows or a vehicle oncoming toward the reference vehicle on an oncoming lane of the road will be referred to as "target vehicle".

Figure 2A:
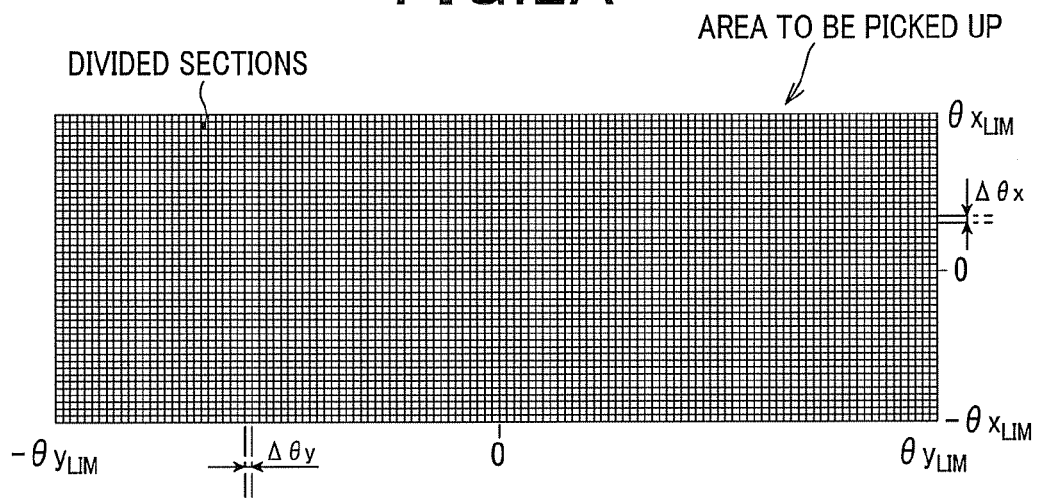
FIG. 2A is a view schematically illustrating an undazzled-area map according to the first embodiment.

In addition, note that "undazzled-area map" means information indicative of a relationship between a boundary distance and each of divided sections of a rectangular image picked up by the camera of the reference vehicle; these divided sections are arranged in rows and columns (see FIG. 2A).

The boundary distance means a maximum distance between the reference vehicle and the target vehicle such that, when the distance between the reference vehicle and the target vehicle is within the maximum distance, the driver of the target vehicle is estimated to be dazzled by the headlights of the reference vehicle.

Referring to FIG. 1, the undazzled-area map producing system 1 includes an input unit 11, an input-file storage unit 13, a processor 15, an output-file storage unit 17, and a display unit 19.

The input unit 11 is made up of one or more manually operable input devices, such as a keyboard, a mouse, and a tablet, and communicably connected to the processor 15. Manual operations of the input unit allow various items of information for the processor 15 to be inputted.

In the first embodiment, the various items of information include:

target-driver's illumination parameters required to calculate illumination toward the target-vehicle driver's eye from each headlight of the reference vehicle;

constants required to calculate an evaluation value W for quantitatively evaluating the level of glare perceived by the driver of the target vehicle;

output defining parameters defining an output format of an undazzled-area map produced by the undazzled-area map producing system 1; and various instructions to the processor 15.

The input-file storage unit 13 consists of, for example, a transportable memory device (external memory device), such as a USB (Universal Serial Bus) memory device, and/or an internal memory, such as a hard disk.

The input-file storage unit 13 works to store, in file format, therein light-distribution data for each headlamp of each headlight of the reference vehicle. The light-distribution data represents a location of each headlamp in a three-dimensional space and an illumination at the location.

The processor 15 is made up of, for example, a common microcomputer and its peripherals, this microcomputer consists of a CPU, a rewritable ROM, a RAM 15a, and so on.

The processor 15 is operative to produce an undazzled-area map based on the parameters and constants entered by the input unit 11 and the light-distribution data stored in the input-file storage unit 13.

The output-file storage unit 17 designed as, for example, a computer-readable storage unit, such as a rewritable memory, works to store therein undazzled-area maps produced by the processor 15.

The display unit 19 is made up of, for example, a Liquid Crystal Display), and operative to display, on its screen, an input image and the undazzled-area maps stored in the output-file storage unit 17.

The headlights to which reference numeral 30 is assigned are located on both sides (left and right sides) of the front end of the reference vehicle. Each of the headlights 30 is equipped with a high-beam module 31 and a low-beam module 33. The high-beam and low-beam modules 31 and 33 of each headlight are stacked vertically such that the low-beam module 33 is located above the high-beam module 31.

The left and right high-beam modules 31 and 31 of the respective headlights include headlamps L1 and L2. The optical axis of each of the headlamps L1 and L2 is directed ahead of the reference vehicle so that a light beam transmitted from each of the headlamps L1 and L2 has longer light distributions.

The left and right low-beam modules 33 and 33 of the respective headlights include headlamps L3 and L4. The optical axis of each of the headlamps L3 and L4 is directed to be dimmed relative to the optical axis of a corresponding one of the headlamps L1 and L2. Each of the low-beam modules 33 is controlled to be turned on independently of the high-beam modules 31, but the high-beam modules 31 are controlled to be turned on only when the low-beam modules 33 are controlled to be turned on.

Specifically, the headlamp L1 is the left headlamp for the high beam, the headlamp L2 is the right headlamp for the high beam, the headlamp L3 is the left headlamp for the low beam, and the headlamp L4 is the right headlamp for the low beam.

A camera 40 installed in the reference vehicle is made up of an image sensor and an optical system. The image sensor consists of a two-dimensional array of a plurality of image-sensor elements, such as charged-coupled devices or MOS image sensor elements. The array of the plurality of image-sensor elements corresponding to a plurality of pixels constitutes an imaging surface of the image sensor. The optical system is configured to focus light from a target on the imaging surface of the image sensor so that an image of the target is picked up by the image sensor. The camera 40 is located at the center of the front end of the reference vehicle in a direction of the width thereof such that an area to be irradiated by the headlights 30 is included within an area to be picked up by the camera 40.

Figures 3A, 3B:
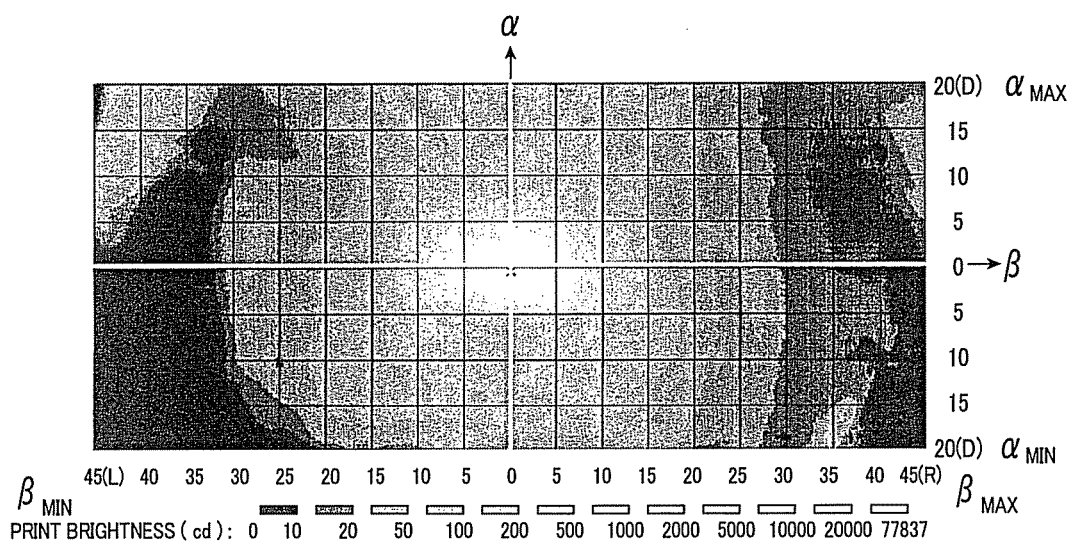
FIG. 3A is a view schematically illustrating items of light-distribution data for each headlamp of the reference vehicle in table format.
FIG. 3B is a graph schematically illustrating equal intensity curves of light of any one of the headlamps of the reference vehicle.

FIG. 3A schematically illustrates items of the light-distribution data for each of the headlamps L1 to L4 in table format, and FIG. 3B schematically illustrates equal intensity curves of light of any one of the headlamps L1 to L4 in graph format.

The equal intensity curves were obtained by measuring an illumination of a measurement region that is generated by irradiating a light beam from any one of the headlamps L1 to L4 ahead about a measurement distance R of 25 meters away therefrom within a range of an elevation angle α from −20 degrees to +20 degrees and within a range of a yaw angle β from −45 degrees to +45 degrees.

Note that the elevation angle represents an angle of the light beam from a headlight in a vertical direction. Specifically, the elevation angle α is zero degrees when the light beam irradiated from a headlight is substantially in parallel to a road surface on which the reference vehicle is placed, this light beam will be referred to as "elevational reference beam" heinafter. The positive sign assigned to the elevation angle represents that the light beam irradiated from a headlight is directed upward with respect to the elevational reference beam in the vertical direction. The negative sign assigned to the elevation angle represents that the light beam irradiated from a headlight is directed downward with respect to the elevational reference beam in the vertical direction.

In addition, note that the yaw angle represents an angle of the light beam from a headlight in a horizontal direction. Specifically, the yaw angle β is zero degrees when the light beam irradiated from a headlight is substantially in parallel to a running direction of the reference vehicle, this light beam will be referred to as "yaw reference beam" heinafter. The positive sign assigned to the yaw angle represents that the light beam irradiated from a headlight is directed rightward with respect to the yaw reference beam in the horizontal direction. The negative sign assigned to the yaw angle represents that the light beam irradiated from a headlight is directed leftward with respect to the yaw reference beam in the horizontal direction.

In FIG. 3B, a vertical axis of the graph represents the elevation angle α within the range from a maximum value $\alpha_{MAX}$ to a minimum value $\alpha_{MIN}$, and a horizontal axis of the graph represents the yaw angle β within the range from a maximum value $\beta_{MAX}$ to a minimum value $\beta_{MIN}$.

Referring to FIG. 3A, the items of the light-distribution data of each of the headlamps L1 to L4 include beam type (high beam or low beam), beam position (left or right), the measurement distance R [m: meters], the minimum value $\alpha_{MIN}$ [deg] and the maximum value $\alpha_{MAX}$ [deg: degrees] of the elevation angle α, a step angle Δα for the elevation angle α, the minimum value $\beta_{MIN}$ [deg] and the maximum value $\beta_{MAX}$ [deg] of the yaw angle β, and a plurality of luminance data $A_{\alpha\beta}$ [candela per square meter: cd/m$^2$].

The illumination of a measurement region generated by irradiating a light beam from any one of the headlamps L1 to L4 ahead about the measurement distance R away therefrom within a range of an elevation angle α from $-\alpha_{MIN}$ to $\alpha_{MAX}$ and within a range of a yaw angle β from $-\beta_{MIN}$ to $\beta_{MAX}$ was measured. Based on the measured illumination, the plurality of luminance data $A_{\alpha\beta}$ was obtained. Specifically, the number (N) of the plurality of luminance data $A_{\alpha\beta}$ is defined by the following equation:

$$N=\{(\alpha_{MAX}-\alpha_{MIN})/\Delta\alpha\}\times\{(\beta_{MAX}-\beta_{MIN})/\Delta\beta\}$$

In other words, the plurality of luminance data $A_{\alpha\beta}$ contains N items of the measured illumination of the measurement region.

Specifically, the beam type (high beam or low beam) and the beam position (left or right) included in one light distribution data define that the corresponding one light distribution data corresponds to any one of the headlamps L1, L2, L3, and L4. Thus, the light distribution data is prepared for each of the headlamps L1, L2, L3, and L4.

FIGS. 4A to 4B schematically represent the parameters and constants to be set by the input unit 11.

Figure 2B:
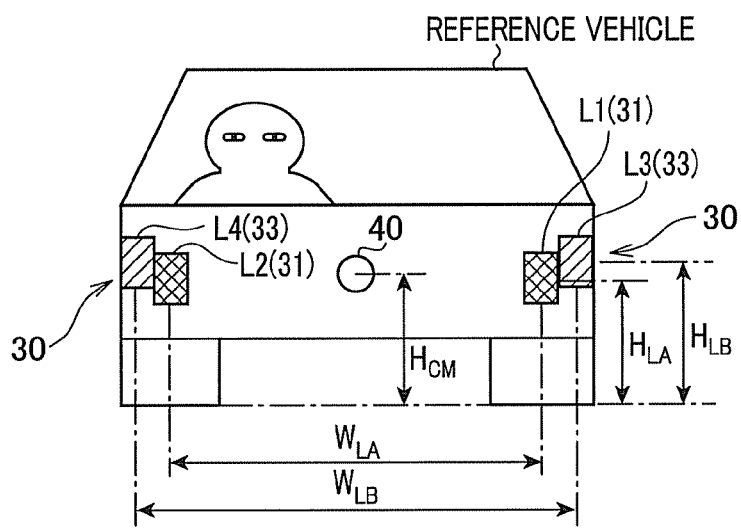
FIG. 2B is a schematic front view of a reference vehicle according to the first embodiment.
Figure 2C:
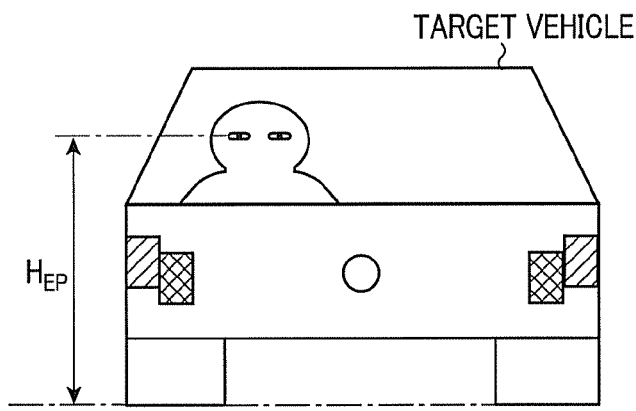
FIG. 2C is a schematic front view of a target vehicle according to the first embodiment.

Referring to FIGS. 2B, 2C, and 4A, the target-driver's illumination parameters include a width WROAD of the lane on which the reference vehicle is placed, an offset width $W_{OFFS}$, a width $W_{LA}$ between the high-beam headlamps L1 and L2, a height $H_{LA}$ of the optical axis of each of the high-beam headlamps L1 and L2 from the surface of the lane as a reference plane, a width $W_{LB}$ between the low-beam headlamps L3 and L4, and a height $H_{LB}$ of the optical axis of each of the low-beam headlamps L3 and L4 from the surface of the lane.

The target-driver's illumination parameters also include a height $H_{CM}$ of the camera 40 located at the center of the front end of the reference vehicle from the surface of the lane, a preset height coefficient K, an eye-point height $H_{EP}$ of the driver of the target vehicle from the surface of the lane or an opposing lane, and a light transmittance τ of the windshield of the reference vehicle.

The offset width $W_{OFFS}$ represents a width between the driver of the target vehicle and the center of the front end of the reference vehicle at which the camera 40 is mounted. The width WROAD of the lane, the offset width $W_{OFFS}$, and the eye-point height $H_{EP}$ of the driver of the target vehicle are, for example, calculated by the processor 15 based on a plurality of images picked up by the camera 40; these plurality of images include the target vehicle and the lane on which the reference vehicle is placed. Each of the values of the parameters $W_{LA}$, $H_{LA}$, $W_{LB}$, $H_{LB}$, and $H_{CM}$ are previously defined as the specifications of the reference vehicle.

The height coefficient K is set according to the height $H_{CM}$ of the camera 40. The height coefficient K can be used to correct differences between created undazzled-area maps due to the valiances of the height $H_{CM}$ of the camera 40.

Referring to FIG. 4B, the constants required to calculate the evaluation value W include adaptation luminance $L_u$ [cd/m$^2$] of the driver of the target vehicle, a constant $C_{p00}$ [lux/min$^{0.46}$], and a constant $C_{pL}$ [cd/m$^2$], these constants $L_u$, $C_{p00}$, and $C_{pL}$ are used by the Schmidt-Clausen and Bindels equation [1]:

$$W = 5.0 - 2\log \sum \frac{E_{Bi}}{C_{p00}\left[1 + \sqrt{\frac{L_u}{C_{pL}}}\right](\theta_i \cdot 60)^{0.46}} \quad [1]$$

where:

$E_{Bi}$ represents an illumination toward the target-vehicle driver's eye from a headlamp Li (i=1, 2, 3, 4) of the reference vehicle, and $\theta_i$ represents an angle formed by the target-vehicle driver's line of sight and the optical axis of a headlamp Li of the reference vehicle. In the first embodiment, each of the constants $C_{p00}$ and $C_{pL}$ are set to 0.03 and 0.04, respectively, and the adaptation luminance $L_u$ is set to 1.

The sigma-term represents the sum of the illuminations toward the target-vehicle driver's eye from respective headlamps Li (i=1, 2, 3, 4) of the reference vehicle.

The output defining parameters include first output defining parameters that define a produced undazzled-area map angular-degree by angular-degree. The output defining parameters also include second output defining parameters that define a produced undazzled-area map pixel by pixel.

Referring to FIG. 4C, the first output defining parameters include the range of an elevation angle θx of the camera 40 from a lower limit angle $-\theta x_{LIM}$ to an upper limit angle $\theta x_{LIM}$, a step angle Δθx for the elevation angle θx, the range of a yaw angle θy of the camera 40 from a lower limit angle $-\theta y_{LIM}$ to an upper limit angle $\theta y_{LIM}$, and a step angle Δθy for the elevation angle θy. The lower limit angle $-\theta x_{LIM}$, the upper limit angle $\theta x_{LIM}$, the lower limit angle $-\theta y_{LIM}$, and the upper limit angle $\theta y_{LIM}$ constitute an undazzled-area map, and the number of divisions of an undazzled-area map in the vertical direction is "$2\theta x_{LIM}/\Delta\theta x$", and the number of divisions of an undazzled-area map in the horizontal direction is "$2\theta y_{LIM}/\Delta\theta y$" (see FIG. 2A).

Referring to FIG. 4D, the second output defining parameters include a focal distance f [millimeters: mm] of the camera 40, the size of each image sensor element of the camera of the width ($W_{EL}$) [mm]×the height ($H_{EL}$) [mm], and the size of an image of the width ($W_{PX}$) [pixels]×the height ($H_{PX}$) [pixels].

The processor 15 stores therein input image data MD, and works to generate an input image IM to be displayed on the display unit 19. The input image IM dialog boxes in which the parameters and the constants are enterable, and a clickable map-production start button for inputting, to the processor 15, an instruction to produce an undazzled-area map.

FIG. 5A schematically illustrates a part of an undazzled-area map to be produced by the processor 15 based on the first output defining parameters and to be stored in the output-file storage unit 17 in table format. FIG. 5B schematically illustrates a part of an undazzled-area map to be produced by the processor 15 based on the second output defining parameters and to be stored in the output-file storage unit 17 in table format. Note that each of FIGS. 5A and 5B represents the top left corner of 3×3 sections of a rectangular area to be picked up as an image by the camera 40 of the reference vehicle.

Referring to FIG. 5A, the part of an undazzled-area map to be stored in the output-file storage unit 17 in table format when the first output defining parameters are selected represents a boundary distance as a function of a variable of the yaw angle θy in a horizontal axis and a variable of the elevation angle θx in a vertical axis. The variable of the yaw angle θy is changed from the lower limit angle $-\theta y_{LIM}$ (for example, −30 degrees in FIG. 5A) to the upper limit angle $\theta y_{LIM}$ by Δθy (for example, 0.5 degrees). Similarly, the variable of the elevation angle θx is changed from the lower limit angle $-\theta x_{LIM}$ (for example, −10 degrees in FIG. 5A) to the upper limit angle $\theta x_{LIM}$ by Δθx (for example, 0.5 degrees).

Referring to FIG. 5B, the part of an undazzled-area map to be stored in the output-file storage unit 17 in table format when the second output defining parameters are selected represents a boundary distance as a function of a variable of a pixel position "x" in the width ($W_{PX}$) in the elevation-angle direction and a variable of a pixel position "y" in the height ($H_{PX}$) in the yaw-angle direction. The variable of the pixel position x in the width ($W_{PX}$) is changed from a lower limit of $-W_{PX}/2$ (for example, −376 in FIG. 5B) to an upper limit of $W_{PX}/2$ by 1. Similarly, the variable of the pixel position y in the height ($H_{PX}$) is changed from a lower limit of $-H_{PX}/2$ (for example, −240 in FIG. 5B) to an upper limit of $H_{PX}/2$ by 1.

For example, in the first embodiment, the pixel position x in the width direction corresponding to the yaw angle direction and the pixel position y in the height direction corresponding to the elevation angle direction are respectively represented by the following equations [2] and [3] (see FIG. 8C):

$$x = \frac{f \cdot \tan\theta x}{H_{EL}} \quad [2]$$

$$y = \frac{f \cdot \tan\theta y}{W_{EL}} \quad [3]$$

where $-H_{PX}/2 \le x \le H_{PX}/2$, and $-W_{PX}/2 \le y \le W_{PX}/2$

Specifically, based on the equations [2] and [3], the boundary distance of a value of the pixel position x and a value of the pixel position y is obtained based on the function of a value of the elevation angle θx and a value of the yaw angle θy; the value of the elevation angle θx and the value of the yaw angle θy correspond to the value of the pixel position x and the value of the pixel position y, respectively.

The processor 15 is operative to carry out a routine to produce undazzled-area maps, and a routine to display, on the screen of the display unit 19, one of the produced undazzled-area maps.

The undazzled-area map producing routine to be executed by the processor 15 will be described hereinafter with reference to FIG. 6A.

In response to, for example, receiving an instruction indicative of the start of the undazzled-area map producing routine inputted by the input unit 11, the processor 15 displays the input image IM on the screen of the display unit 19 based on the input image data MD stored therein in step S11.

The driver of the reference vehicle operates the input unit 11 to input values of the various parameters and the various constants illustrated in FIGS. 4A to 4D in the dialog boxes of the input image IM with an aid of the processor 15.

The processor 15 receives the inputted values of the various parameters and the various constants illustrated in FIGS. 4A to 4B in step S12.

Next, the processor 15 determines whether the map-production start button is clicked by the operation of the input unit 11 by the driver of the reference vehicle in step S13.

Upon determining that the map-production start button is not clicked (No in step S13), the processor 15 repeats the receiving process in step S12 and the determining process in step S13.

Upon determining that the map-production start button is clicked by the operation of the input unit 11 (YES in step S13), the processor 15 proceeds to step S14.

In step S14, the processor 15 accesses the input-file storage unit 13 and obtains the light-distribution data of each of the headlamps L1 to L4 stored in file format in the input-file storage unit 13. Specifically, the processor 15 reads out, from the input-file storage unit 13, the light-distribution data of the left headlamp L1 for the high beam, the light-distribution data of the right headlamp L2 for the high beam, the light-distribution data of the left headlamp L3 for the low beam, and the light-distribution data of the right headlamp L4 for the low beam.

In step S15, the processor 15 runs a boundary distance calculating subroutine to calculate a boundary distance for each of the divided sections of the rectangular area to be picked up by the camera 40 based on the received parameters and constants in step S12 and the light-distribution data of each of the headlamps L1 to L4.

Next, the boundary distance calculating subroutine in step S15 will be fully described hereinafter with reference to FIG. 7.

When running the boundary distance calculating subroutine, the processor 15 allocates a memory area MA in the RAM 15a based on the first output defining parameters $\theta x_{LIM}$, $\Delta\theta x$, $\theta y_{LIM}$, and $\Delta\theta y$ in step S21. The memory area MA allows storage of an undazzled-area map having the number of divided sections; this number is represented as the product of "$2\theta x_{LIM}/\Delta\theta x$" and "$2\theta y_{LIM}/\Delta\theta y$".

Next, in step S22, the processor 15 selects a value of the elevation angle $\theta x$ within the range from the lower limit angle $-\theta x_{LIM}$ to the upper limit angle $\theta x_{LIM}$ and a value of the yaw angle $\theta y$ within the range from the lower limit angle $-\theta y_{LIM}$ to the upper limit angle $\theta y_{LIM}$; these selected values of the elevation angle $\theta x$ and the yaw angle $\theta y$ specify one of the divided sections for which a boundary distance has not been calculated. This specified one of the divided sections will be referred to as "target divided section" hereinafter.

Next, in step S23, the processor 15 selects, as a target inter-vehicle distance D, one of previously prepared inter-vehicle distances within the range from 10 [m] to 3000 [m] at 1 [m] intervals; for the selected one of the previously prepared inter-vehicle distances, no evaluation value W has been calculated in step S26.

The processor 15 calculates, based on the target-driver's illumination parameters, a first incident angle (the elevation angle $\alpha i$) and a second incident angle (the yaw angle ($\beta i$) for each of the headlamps Li (i=1, 2, 3, and 4) in step S24.

Specifically, in step S24, the first incident angle is formed by the target-driver's line of sight and the optical axis of each of the headlamps Li (i=1, 2, 3, and 4) in the vertical direction; the target-driver's line of sight is determined when the eye-point of the driver of the target vehicle is assumed to be located at the target inter-vehicle distance D and the selected value of the elevation angle $\theta x$.

In step S24, the second incident angle is formed by the target-driver's line of sight and the optical axis of each of the headlamps Li (i=1, 2, 3, and 4) in the horizontal direction; the target-driver's sight is determined when the eye-point of the target-vehicle driver's eye-point is located at the target inter-vehicle distance D and the selected value of the yaw angle $\theta y$.

Specifically, in step S24, the processor 15 calculates the elevation angles $\alpha 1$ to $\alpha 4$ for the respective headlamps L1 to L4 in accordance with the following equations [4] and [5] (see FIG. 8A):

$$\alpha 1 = \alpha 2 = \tan^{-1}\left(\frac{D \cdot \tan\theta x - (H_{LA} - H_{CM})}{D}\right) \quad [4]$$

$$\alpha 3 = \alpha 4 = \tan^{-1}\left(\frac{D \cdot \tan\theta x - (H_{LB} - H_{CM})}{D}\right) \quad [5]$$

In step S240, the processor 15 also calculates the yaw angles $\beta 1$ to $\beta 4$ for the respective headlamps L1 to L4 in accordance with the following equations [6] to [9] (see FIG. 8B):

$$\beta 1 = \tan^{-1}\left(\frac{D \cdot \tan\theta y + \frac{W_{LA}}{2}}{D}\right) \quad [6]$$

$$\beta 2 = \tan^{-1}\left(\frac{D \cdot \tan\theta y - \frac{W_{LA}}{2}}{D}\right) \quad [7]$$

$$\beta 3 = \tan^{-1}\left(\frac{D \cdot \tan\theta y + \frac{W_{LB}}{2}}{D}\right) \quad [8]$$

$$\beta 4 = \tan^{-1}\left(\frac{D \cdot \tan\theta y - \frac{W_{LB}}{2}}{D}\right) \quad [9]$$

In step S25, the processor 15 calculates the illumination $E_{Bi}$ directed toward the target-vehicle driver's eye from each headlamp Li of the reference vehicle.

Specifically, in step S25, the processor 15 extracts luminance data $A_{\alpha i \beta i}$ from the plurality of luminance data $A_{\alpha, \beta}$; this luminance data $A_{\alpha i \beta i}$ is specified by the calculated elevation angle $\alpha i$ and the calculated yaw angle $\beta i$.

Based on the extracted luminance data $A_{\alpha i \beta i}$, the target inter-vehicle distance D, and the light transmission $\tau$ of the windshield of the reference vehicle, the processor 15 calculates the illumination $E_{Bi}$ directed toward the target-vehicle driver's eye from each headlamp Li of the reference vehicle in accordance with the following equation [10]:

$$E_{Bi} = \frac{Ai}{D^2} \cdot \tau \quad [10]$$

Next, the processor 15 uses the Schmidt-Clausen and Bindels equation [1], the calculated illuminations $E_{B1}, E_{B2}, E_{B3}, E_{B4}$, and the calculated elevation angles $\alpha 1$ to $\alpha 4$ and yaw angles $\beta 1$ to $\beta 4$ to thereby calculate the evaluation value W indicative of the level of glare to be perceived by the driver of the target vehicle in step S26.

In step S27, the processor 15 determines whether the evaluation values W have been calculated for all of the previously prepared inter-vehicle distances for the target divided section.

Upon determining that the evaluation values W have not been calculated for all of the previously prepared inter-vehicle distances (NO in step S27), the processor 15 returns to step S23, and repeats the processes in steps S23 to S27 until the determination in step S27 is affirmative.

Otherwise, upon determining that the evaluation values W have been calculated for all of the previously prepared inter-vehicle distances (YES in step S27), the processor 15 proceeds to step S28.

In step S28, the processor 15 extracts, as a boundary distance, a maximum inter-vehicle distance from all of the previously prepared inter-vehicle distances; the evaluation value W corresponding to the extracted maximum inter-vehicle distance is less than the rating of 4.

Then, in step S28, the processor 15 stores the boundary distance in a location of the memory area MA in the RAM 15a; this location corresponds to the selected value of the elevation angle θx and the selected value of the yaw angle θy.

Next, in step S29, the processor 15 determines whether the boundary distance has been determined for each of the divided sections.

Upon determining that the boundary distance has not been determined yet for at least one divided section (NO in step S29), the processor 15 returns to step S22, and repeats the processes of step S22 to S29 until the determination in step S29 is affirmative.

Otherwise, upon determining that the boundary distance has been determined for each of the divided sections (YES in step S29), the boundary distance determined for each of the divided sections has been stored in a corresponding location of the memory area MA in the RAM 15a. This results in that the boundary distances determined for the respective divided sections have been stored in the corresponding locations of the memory area MA in the RAM 15a as an undazzled-area map angular degree by angular-degree.

Specifically, after the affirmative determination in step S29, the processor 15 terminates the boundary distance calculating subroutine in step S15, proceeding to step S16.

In step S16, the processor 15 reads the undazzled-area map angular-degree by angular-degree, and converts the undazzled-area map angular-degree by angular-degree into an undazzled-area map pixel by pixel in accordance with, for example, the equations [2] and [3] set forth above.

In step S16, the processor 15 stores the undazzled-area map angular-degree by angular-degree and the undazzled-area map pixel by pixel in the output-file storage unit 17 in file format (see FIGS. 5A and 5B), terminating the undazzled-map producing routine.

Figure 6A:
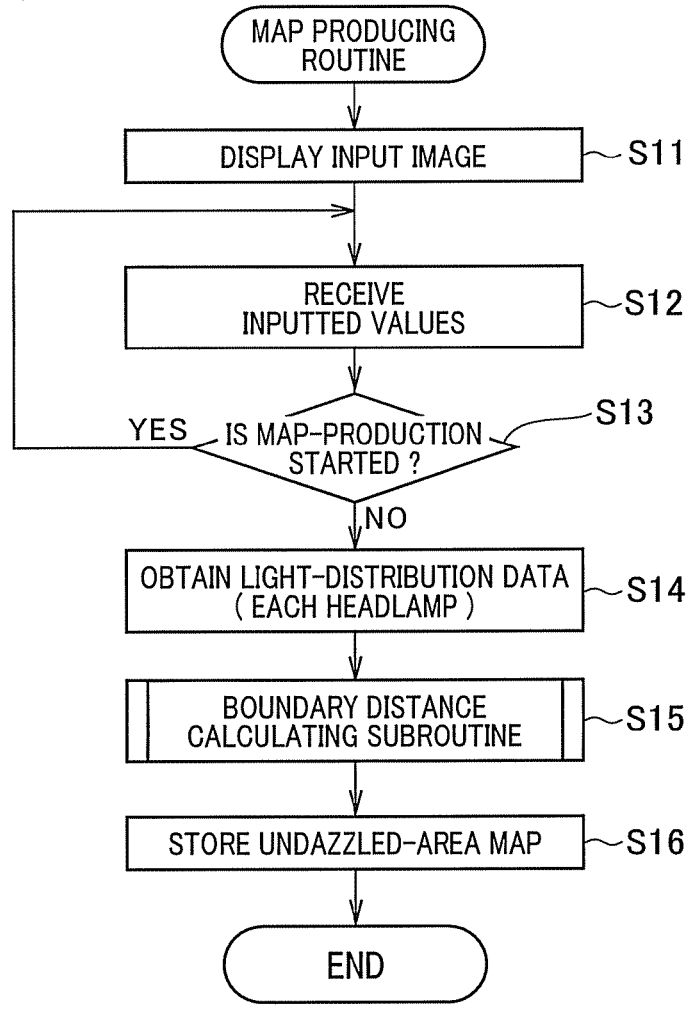
FIG. 6A is a flowchart schematically illustrating an undazzled-area map producing routine to be executed by the processor according to the first embodiment.
Figure 6B:
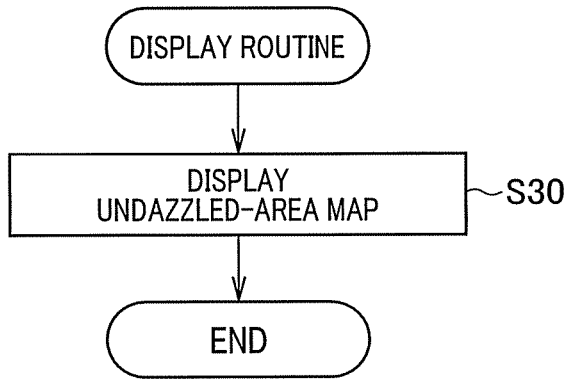
FIG. 6B is a flowchart schematically illustrating a display routine to be executed by the processor according to the first embodiment.

In response to, for example, receiving an instruction indicative of the display of one of the undazzled-area maps stored in the output-file storage unit 17, the processor 15 carries out the undazzled-area map displaying routine in step S30 of FIG. 6B.

Specifically, in step S30, the processor 15 reads out one of the undazzled-area maps stored in the output-file storage unit 17 and corresponding to the instruction, and displays the readout undazzled-area map on the screen of the display unit 19.

As described above, an undazzled-area map stored in the output-file storage unit 17 represents a relationship between a boundary distance and each of the divided sections of the rectangular area to be picked up as an image by the camera 40 of the reference vehicle (see FIG. 2A).

The boundary distance means a maximum inter-vehicle distance between the reference vehicle and the target vehicle for each of the divided sections of the rectangular area to be picked up by the camera 40 such that, when the eye-point of the driver of the target vehicle is located at one of the divided sections and the inter-vehicle distance between the reference vehicle and the target vehicle is equal to or shorter than the boundary distance corresponding to the one of the divided sections, the driver of the target vehicle can be estimated to be dazzled (to be discomforted due to glare).

As described above, an undazzled-area map to be produced by the undazzled-area map producing system 1 represents a relationship between a boundary distance and each of the divided sections of the rectangular area to be picked up as an image by the camera 40 of the reference vehicle; this boundary distance allows, when the target vehicle is located within the boundary distance relative to the reference vehicle, the processor 15 to estimate that the driver of the target vehicle feels discomfort due to glare.

Thus, when the inter-vehicle distance between the reference vehicle and the target vehicle is obtained and the target vehicle is included in an image picked up by the camera 40 so that a position of the eye-point of the driver of the target vehicle is obtained based on, for example, the offset width $W_{OFFS}$ and the eye-point height $H_{EP}$ of the driver of the target vehicle, the boundary distance for the position of the eye-point of the driver of the target vehicle is easily determined based on an undazzled-area map stored in the output-file storage unit 17.

This allows the processor 15 to easily estimate whether the headlights 30 dazzle the driver of the target vehicle (whether the driver of the target vehicle feels discomfort due to glare) by comparing the inter-vehicle distance with the determined boundary distance.

This allows adjustment, in real time, of the light distribution of each headlight 30 based on an undazzled-area map produced by the processor 15 to prevent the driver of the target vehicle from being dazzled without unnecessarily limiting the view of the driver of the reference vehicle.

In addition, an undazzled-area map produced by the undazzled-area map producing system 1 allows the processor 15 to determine whether the headlights 30 dazzle the driver of the target vehicle with the use of the boundary distance corresponding to the position of the eye point of the driver of the target vehicle without using road conditions, such as road gradients and/or road curvatures. Thus, an undazzled-area map produced by the undazzled-area map producing system 1 can be used independently of any road conditions.

The undazzled-area map producing system 1 is configured to produce an undazzled-area map for the reference vehicle based on the various parameters and constants inputted through the input unit 11 and the light-distribution data for each headlamp of the reference vehicle. Thus, a plurality of items of the light-distribution data for a plurality of reference vehicles each in which a camera is installed can be prepared and stored in file format in the input-file storage unit 13. This allows the undazzled-area map producing system 1 to produce a plurality of undazzled-area maps for the plurality of reference vehicles, respectively.

Second Embodiment

A headlight control system 51 to which the present invention is applied according to the second embodiment thereof will be described hereinafter with reference to FIGS. 9 to 14A.

Like parts between the headlight control system 51 and the undazzled-area map producing system 1, to which like reference characters are assigned, are omitted or simplified in description.

The headlight control system 51 is installed in a vehicle to be controlled, such as a motor vehicle running or temporally halting in a lane of a road. The vehicle in which the headlight control system 51 is installed will be referred to as "reference vehicle" hereinafter.

Specifically, the headlight control system 51 is equipped with a processor 60, a front camera 65, and a distance detector 66. The processor 60, the front camera 65, and the distance detector 66 are connected to each other via a CAN (Controller area Network) bus 53. The CAN bus 53 allows the processor 60, the front camera 65, and the distance detector 66 to communicate with each other in a CAN communication protocol.

The headlights 30 are located on both sides (left and right sides) of the front end of the reference vehicle. Each of the headlights 30 is equipped with at least two high-beam LEDs 31 and at least two low-beam LEDs 33. The high-beam and low-beam LEDs 31 and 33 of each headlight are stacked vertically such that the low-beam LEDs 33 are located above the high-beam LEDs 31, respectively.

The left and right high-beam LEDs 31 and 31 of the respective headlights serve as headlamps L1 and L2. The optical axis of each of the headlamps L1 and L2 is directed ahead of the reference vehicle so that a light beam transmitted from each of the headlamps L1 and L2 has longer light distributions.

The left and right low-beam LEDs 33 and 33 of the respective headlights serve as headlamps L3 and L4. The optical axis of each of the headlamps L3 and L4 is directed to be dimmed relative to the optical axis of a corresponding one of the headlamps L1 and L2. Each of the low-beam LEDs 33 is controlled to be turned on independently of the high-beam LEDs 31, but the high-beam LEDs 31 are controlled to be turned on only when the low-beam LEDs 33 are controlled to be turned on. The high-beam LEDs 31 are controlled to be simultaneously turned on and off.

Specifically, the headlamp L1 is the left headlamp for the high beam, the headlamp L2 is the right headlamp for the high beam, the headlamp L3 is the left headlamp for the low beam, and the headlamp L4 is the right headlamp for the low beam.

The processor 60 is connected to a LIN (Local Interconnect Network) bus 55, and the LIN bus 55 is connected to a pair of headlights 70. The LIN bus 55 allows the processor 60 and the pair of headlights 70 to communicate with each other in a LIN protocol.

The front camera 65 installed in the reference vehicle is made up of an image sensor and an optical system. The image sensor consists of a two-dimensional array of a plurality of image-sensor elements, such as charged-coupled devices or MOS image sensor elements. The array of the plurality of image-sensor elements corresponding to a plurality of pixels constitutes an imaging surface of the image sensor. The optical system is configured to focus light from a target on the imaging surface of the image sensor so that an image of the target is picked up by the image sensor. The front camera 40 is located at the center of the front end of the reference vehicle in a direction of the width thereof such that an area to be irradiated by the headlights 30 is included within a predetermined rectangular area to be picked up by the front camera 65.

The front camera 65 is operative to periodically or continuously pick up a plurality of images of the predetermined rectangular area ahead of the reference vehicle, and send, to the processor 60, the plurality of images picked up thereby in digital format (CAN format).

The distance detector 66 is operative to periodically or continuously pick up a plurality of images of a predetermined area ahead of the reference vehicle.

Specifically, the distance detector 66 is designed as a radar and/or sonar and operative to:

transmit radio waves and/or ultrasonic waves ahead of the reference vehicle;

receive echoes based on the transmitted radio waves and/or ultrasonic waves; and detect the distance between the reference vehicle and a target object and the location of the target object.

As the target object, a vehicle that the reference vehicle follows, a vehicle oncoming toward the reference vehicle on an oncoming lane of the road, or a passer-by can be considered.

The distance detector 66 is also operative to send, to the processor 60, a detected value of the distance between the reference vehicle and the target object and a detected value of the position of the target object in digital format (CAN format).

The distance detector 66 can be operative to periodically or continuously execute a distance detecting task by:

receiving the plurality of images picked up by the front camera 65;

subjecting the received images to common image processing for inter-vehicle distance detection to thereby detect the distance between the reference vehicle and a target object and the location of the target object; and sending, to the processor 60, a detected value of the distance between the reference vehicle and the target object and a detected value of the location of the target object in digital format (CAN format).

For example, the common image processing for detecting an oncoming vehicle or a preceding vehicle as the target object includes a process designed to:

find a pair of headlights of an oncoming vehicle and/or a pair of tail lights (tail lamps) of a preceding vehicle based on the picked-up images ahead the reference vehicle;

measure an interval between the paired headlights and/or an interval between the paired tail lamps; and determine the distance between the reference vehicle and the oncoming vehicle based on the measured interval between the paired headlights and/or the distance between the reference vehicle and the preceding vehicle based on the measured interval between the paired tail lamps.

The processor 60 is made up of, for example, a common microcomputer and its peripheries, this microcomputer consists of a CPU, a rewritable ROM, a RAM, and so on.

The processor 60 includes a data storage unit 61 constituted by the rewritable ROM, the RAM, and/or another computer-readable storage unit stores therein various items of information associated with the reference vehicle, and the light-distribution data for each headlamp of each headlight of the reference vehicle described in the first embodiment. The data storage unit 61 also stores therein undazzled-area maps according to the first embodiment produced by the processor 60 or another computer circuit, such as the processor 15.

Sensors 68 including a vehicle speed sensor, a yaw rate sensor, a steering sensor, and the like are installed in the reference vehicle. The sensors 68 are connected to the CAN bus 53. The CAN bus 53 allows the processor 60 and the sensors 68 to communicate with each other in the CAN communication protocol.

The vehicle speed sensor is operative to periodically or continuously measure the speed of the reference vehicle and to send, to the processor 60, a measured value of the vehicle speed in digital format (CAN format). The yaw rate sensor is operative to periodically or continuously measure, as a yaw rate, the rate of rotation about a vertical axis that passes through the reference vehicle's center of gravity, and to output, to the processor 60, a signal indicative of the measured yaw rate in digital format (CAN format). The steering sensor is operative to measure an angular displacement of a steering wheel operated by the driver. The steering sensor is operative to send, to the processor 60, information indicative of the angular displacement of the steering wheel in digital format (CAN format).

The processor 60 is operative to receive measured data sent via the CAN bus 53 from the sensors 68, and execute, based on the received measured data, a headlight control task.

The headlight control task is to:

determine a first target angle to which an angle of the optical axis of each headlight 30 should be directed with respect to a first reference angle in the vertical direction orthogonal to the road surface on which the reference vehicle is running;

determine a second target angle to which an angle of the optical axis of each headlight 30 should be directed with respect to a second reference angle in the horizontal direction orthogonal to the vertical direction;

determine a target quantity of light to be irradiated from each headlight 30; and determine at least one of the headlamps L1 to L4 for each headlight 30 to activate it.

The processor 60 is also operative to individually send, to each headlight 30 via the LIN bus 55, an instruction in LIN format for causing each headlight 30 to:

direct the optical axis of each headlight 30 at both the first target angle and the second target angle;

activate a corresponding at least one headlamp to irradiate a light beam with the determined quantity of light; and/or deactivate a corresponding at least one headlamp.

Figure 9:
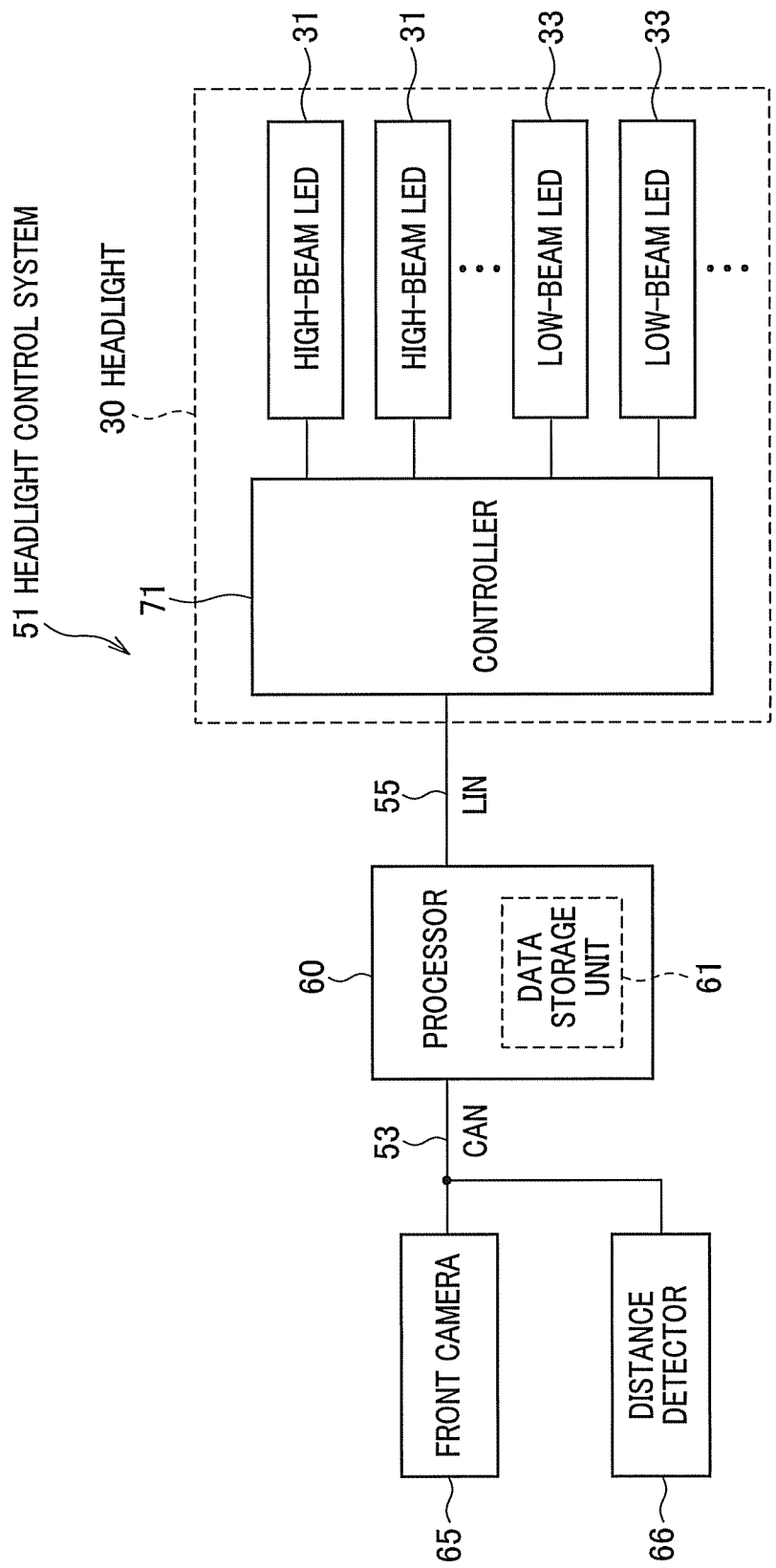
FIG. 9 is a block diagram schematically illustrating an example of the overall structure of a headlight control system according to the second embodiment of the present invention.

As described above, the headlights 30 are located on the left and right sides of the front end of the reference vehicle. In FIG. 9, one of the paired headlight 30 is only illustrated for the sake of simplicity.

Referring to FIG. 2B, the left headlight 30 is provided with a controller 71, the left high-beam LEDs 31 (left high-beam headlamps L1), and the left low-beam LEDs 33 (left low-beam headlamps L3). The right headlight 30 is provided with a controller 71, the right high-beam LEDs 31 (right high-beam headlamps L2), and the right low-beam LEDs 33 (right low-beam headlamps L4)

The controller 71 of each of the headlights 30 is connected to the processor 60 via the LIN bus 55 and is designed as a common microcomputer and its peripherals; this microcomputer consists of a CPU, a rewritable ROM, a RAM, and so on.

The controller 71 of each of the headlights 30 is operative to drive an actuator prepared for each of the LEDs 31 and 33 to thereby adjust the direction of the optical axis of each of the LEDs 31 and 33 based on the instruction including the first and second target angles and sent from the processor 60.

The controller 71 of each of the headlights 30 is also operative to activate and/or deactivate a corresponding at least one of the LEDs 31 and 33 based on the instruction sent from the processor 60.

As well as the first embodiment, an undazzled-area map stored in the data storage unit 61 means information indicative of a relationship between a boundary distance and each of divided sections of a rectangular area to be picked up as an image by the front camera 65 of the reference vehicle; these divided sections are arranged in rows and columns (see FIG. 10). An undazzled-area map is produced by the processor 60 or another computer circuit in the same manner as the first embodiment when each of the headlamps L1 to L4 are turned on.

The boundary distance means a maximum distance between the reference vehicle and a target person such that, when the distance between the reference vehicle and the target person is outside the maximum value, the target person is estimated to be undazzled by the headlights of the reference vehicle.

In FIG. 10, the divided sections of the rectangular area to be picked up as an image by the front camera 65 are illustrated. The boundary distances at the divided sections of the center row are represented as a graph, and the boundary distances at the divided sections of the center column are represented as a graph.

A relationship between the location in an undazzled-area map and a corresponding boundary distance depend on the orientation of the optical axis of each headlight 30 and/or the area to be irradiated by each headlight 30. For example, in FIG. 10, a boundary distance is the highest when a corresponding divided section (pixel) is located at the center of an undazzled-area map, and a boundary distance is gradually reduced with a corresponding divided section being away from the center of an undazzled-area map.

Note that the headlights 30 commonly have an irradiating area left ahead of the reference vehicle wider than an irradiating area right ahead thereof. For this reason, boundary distances at divided sections corresponding to the left ahead of the reference vehicle are larger than those at divided sections corresponding to the right ahead thereof.

Undazzled-area maps to be stored in the data storage unit 61 are configured such that a boundary distance associated with each divided section has such a tendency set forth above.

Undazzled-area maps to be stored in the data storage unit 61 are produced in the same manner as the first embodiment in order to increase the accuracy of detection of the level of glare a target person perceives.

Figure 7:
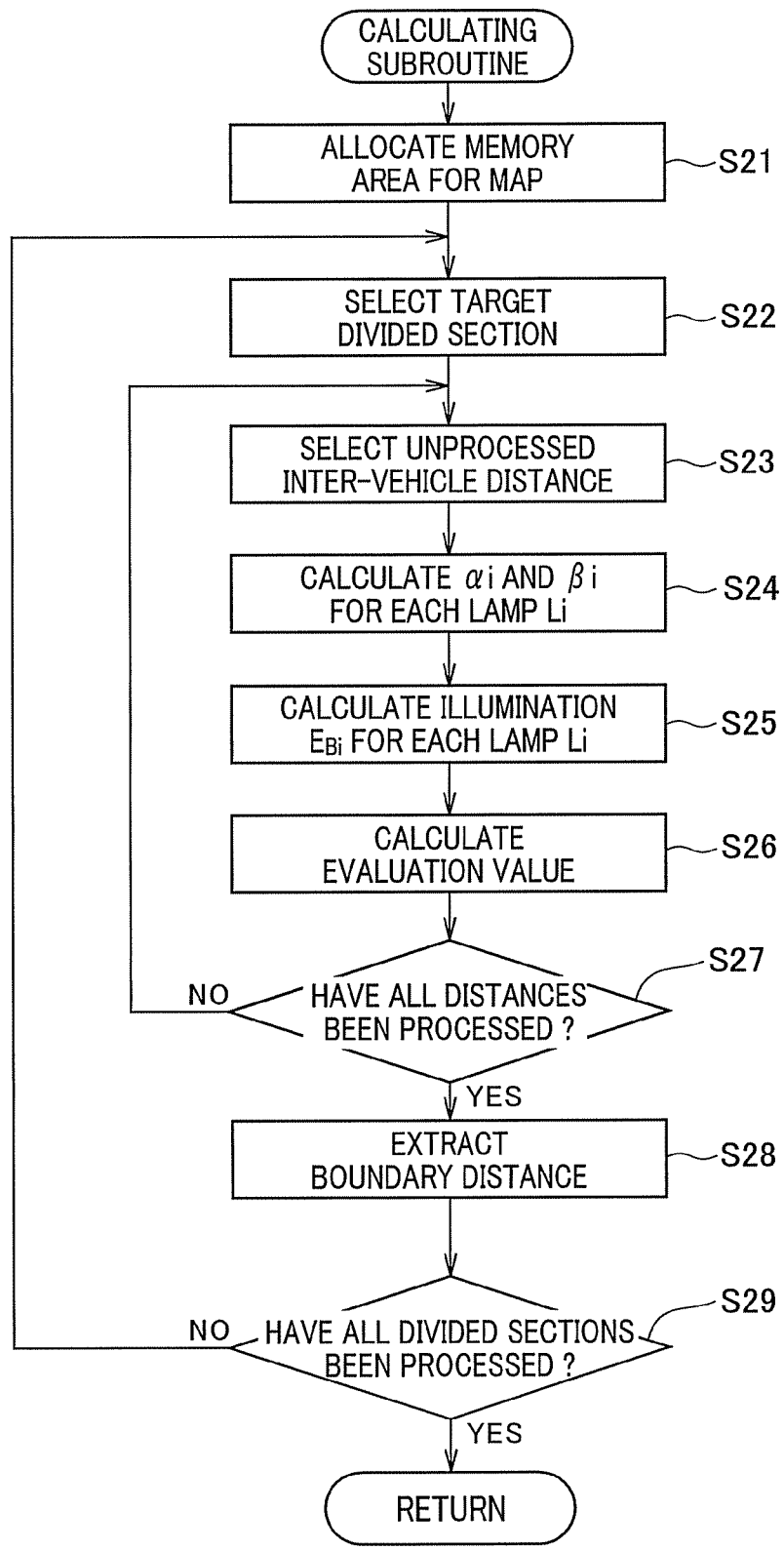
FIG. 7 is a flowchart schematically illustrating a boundary distance calculating subroutine of the undazzled-area map producing routine.

Specifically, the undazzled-area map angular-degree by angular-degree and the undazzled-area map pixel by pixel are produced by the processor 60 or another computer circuit by carrying out the undazzled-area map producing routine illustrated in FIGS. 6A and 7 to be stored in the data storage unit 61.

As described above, an undazzled-area map to be stored in the data storage unit 61 represents a relationship between a boundary distance and each of the divided sections of the rectangular area to be picked up as an image by the front camera 65 of the reference vehicle; this boundary distance allows, when the target vehicle is located within the boundary distance relative to the reference vehicle, the processor 60 or controller 71 to estimate that the driver of the target vehicle feels discomfort due to glare.

Use of an undazzled-area map to be produced by the undazzled-area map producing routine illustrated in FIGS. 6A and 7 can substantially estimate whether the headlights 30 dazzle a passer-by, such as a pedestrian. In order to increase the accuracy of detecting the level of glare of a passer-by, in the second embodiment, undazzled-area maps for a target passer-by have been produced by the processor 60 or another computer circuit by carrying out the undazzled-area map producing routine illustrated in FIGS. 6A and 7 to be stored in the data storage unit 61.

Note that, in the second embodiment, a passer-by, such as a pedestrian, that is placed in front of the reference vehicle will be referred to as "target passer-by".

Figure 8A:
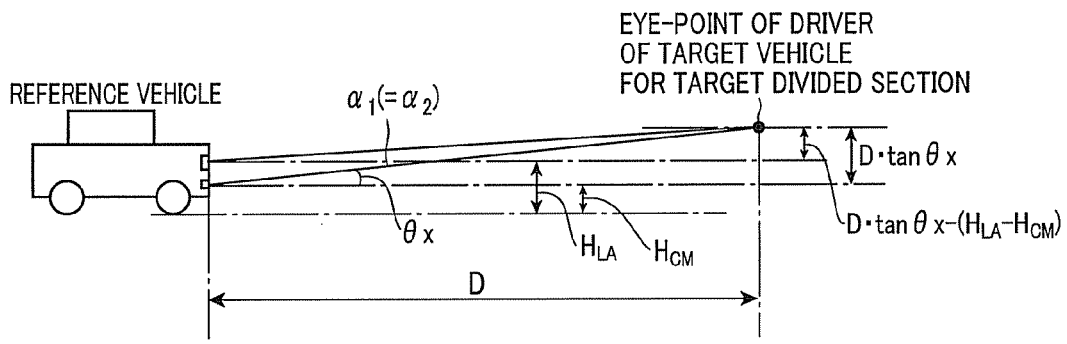
FIG. 8A is a view schematically illustrating a first incident angle formed by a target-driver's line of sight and the optical axis of each of the headlamps in a vertical direction.
Figure 8B:
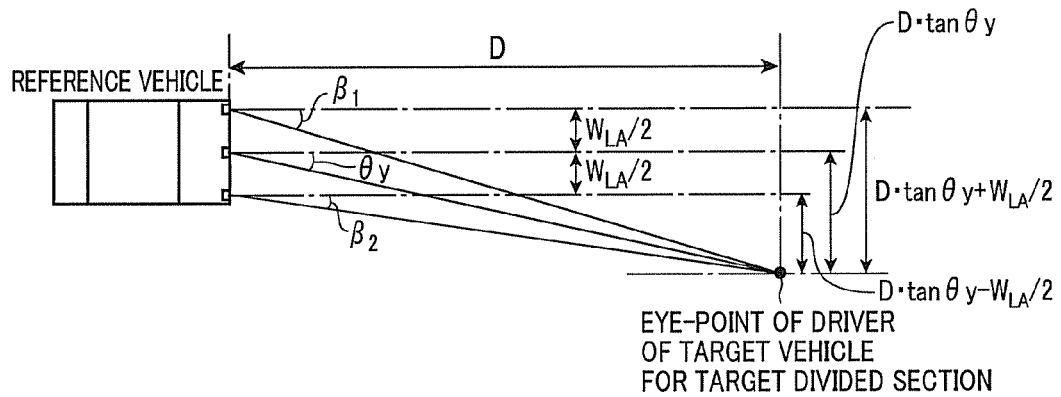
FIG. 8B is a view schematically illustrating a second incident angle formed by the target-driver's line of sight and the optical axis of each of the headlamps in a horizontal direction.
Figure 8C:
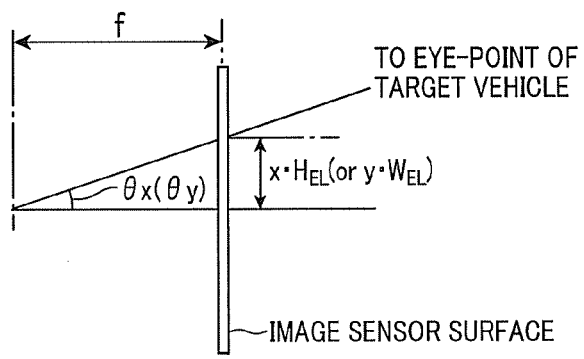
FIG. 8C is a view schematically illustrating a relationship between a focal length of a camera of the reference vehicle and the size of each image-sensor element of the camera according to the first embodiment.
Figure 11A:
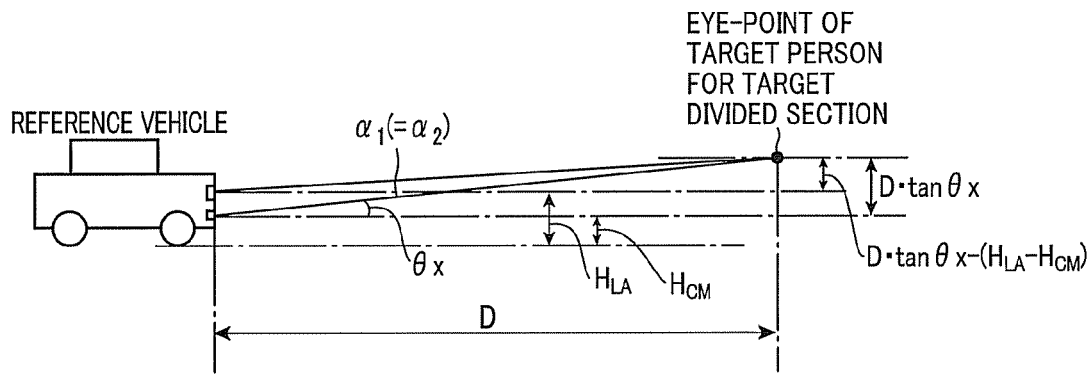
FIG. 11A is a view schematically illustrating a first incident angle formed by a target person's line of sight and the optical axis of each of the headlamps in a vertical direction.
Figure 11B:
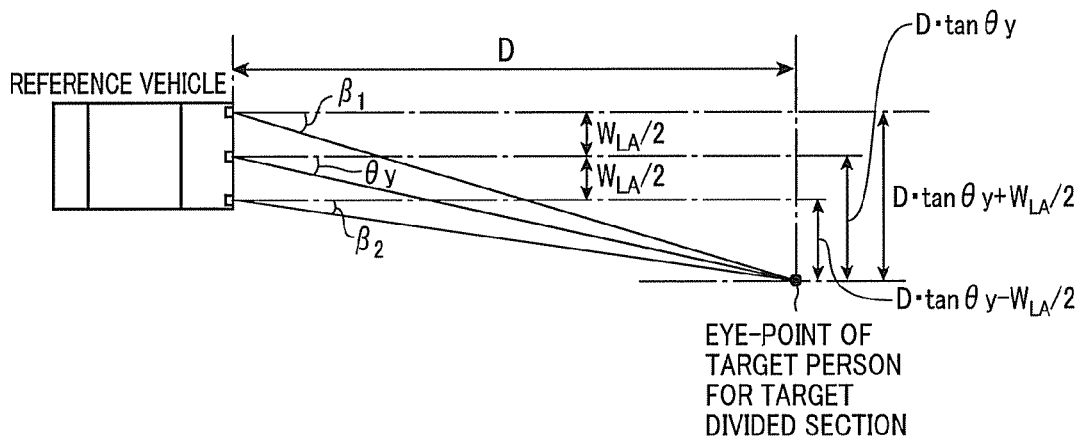
FIG. 11B is a view schematically illustrating a second incident angle formed by the target person's line of sight and the optical axis of each of the headlamps in a horizontal direction.
Figure 11C:
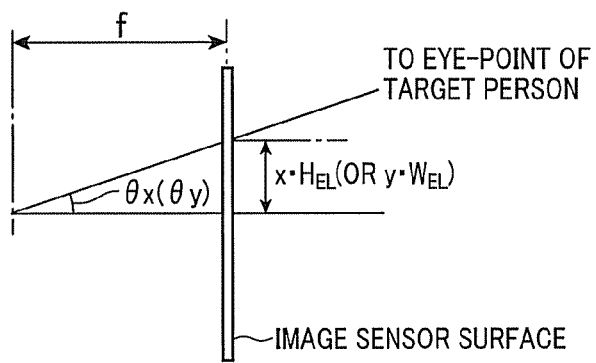
FIG. 11C is a view schematically illustrating a relationship between a focal length of a camera of the reference vehicle and the size of each image-sensor element of the camera according to the second embodiment.
Figure 12:
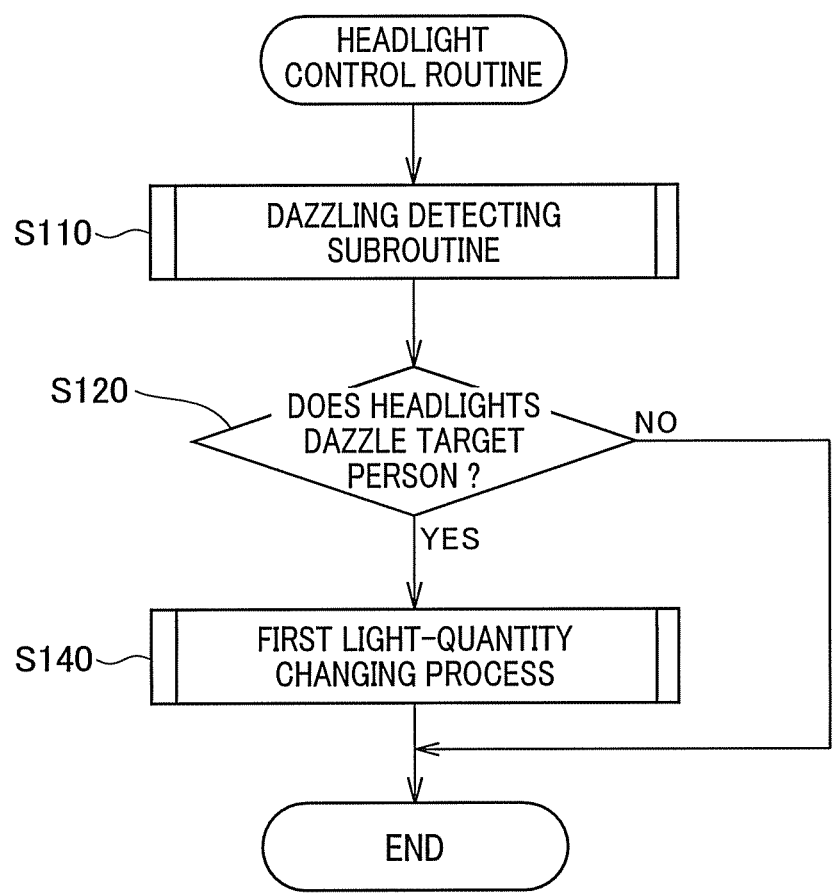
FIG. 12 is a flowchart schematically illustrating a headlight control routine to be executed by a processor of the headlight control system according to the second embodiment.

Specifically, as illustrated in FIGS. 11A to 11C corresponding to FIGS. 8A to 8C, when undazzled-area maps for the target passer-by, in step S25 of FIG. 7, the processor 60 or another computer circuit calculates the illumination $E_{Bi}$ directed toward the eye-point of the target passer-by from each headlamp Li of the reference vehicle.

Specifically, in step S25, the processor 60 or another computer circuit extracts luminance data $A_{\alpha i \beta i}$ from the plurality of luminance data $A_{\alpha, \beta}$; this luminance data $A_{\alpha i \beta i}$ is specified by the calculated elevation angle $\alpha i$ and the calculated yaw angle $\beta i$.

Based on the extracted luminance data $A_{\alpha i \beta i}$, the target distance D between the reference vehicle and the target passer-by, and the light transmission $\tau$ of the windshield of the reference vehicle, the processor 60 or another computer circuit calculates the illumination $E_{Bi}$ directed toward the target passer-by's eye from each headlamp Li of the reference vehicle in accordance with the following equation [10]:

$$E_{Bi} = \frac{A_i}{D^2} \cdot \tau \quad [10]$$

Next, the processor 60 or another computer circuit uses the Schmidt-Clausen and Bindels equation [1], the calculated illuminations $E_{B1}, E_{B2}, E_{B3}, E_{B4}$, and the calculated elevation angles α1 to α4 and yaw angles β1 to β4 to thereby calculate the evaluation value W indicative of the level of glare to be perceived by the target passer-by in step S26.

Note that an undazzled-area map in angular-degree format and an undazzled-area map in pixel format for the driver of the target vehicle according to the first embodiment will be referred to as "driver undazzled-area maps" hereinafter. In addition, note that undazzled-area maps in angular-degree format and in pixel format for the target passer-by according to the second embodiment will be referred to as "passer-by undazzled-area maps" hereinafter.

In addition, as understood by the Schmidt-Clausen and Bindels equation [1], adjustment of the identifier "i" in the Schmidt-Clausen and Bindels equation [1] allows a plurality of types of the first and second undazzled-area maps to be produced. For example, each type of undazzled-area maps depends on which headlamp is turned on.

As described above, the headlight control system 51 according to the second embodiment has stored in the data storage unit 61 the driver undazzled-area maps for the driver of the target vehicle and the passer-by undazzled-area maps for the target passer-by.

Next, operations of the headlight control system 51 for reducing the level of glare for a target person will be described hereinafter. A headlight control routine to be executed by the processor 60 will be described hereinafter with reference to FIG. 12.

The headlight control routine is started when, for example, the high-beam LEDs 31 are simultaneously turned on, and repeatedly carried out by the processor 60 until the high-beam LEDs 31 are simultaneously turned off.

When starting the headlight control routine, the processor 60 runs a dazzling detecting subroutine in step S110.

Next, the dazzling detecting subroutine in step S110 will be fully described hereinafter with reference to FIG. 13.

When running the dazzling detecting subroutine, the processor 60 obtains images picked up by the front camera 65 in step S210, and carries out a target-person detecting process based on the picked-up images in step S220. Note that, as described above, as a target person, the driver of a target vehicle (preceding vehicle or oncoming vehicle) and a passer-by, such as a pedestrian, a bicyclist, or the like are appropriated.

Specifically, in step S220, when an image pattern representing a passer-by is presented in a picked-up image, the processor 60 determines the location of the eye-point of a passer-by as the target person in the picked-up image. In step S220, when a pair of tail lamps or a pair of headlights are presented in a picked-up image, the processor 60 determines the location of the eye-point of the driver of a target vehicle (preceding vehicle or oncoming vehicle) as the target person based on the position of the paired tail lamps or the paired headlights.

Next, the processor 60 obtains the actually measured distance between the reference vehicle and a target person and the location of the target person detected by the distance detector 60, and associates the actually measured distance and the location of the target person in step S230.

Then, in step S240, the processor 60 determines whether any target person were detected based on the target-person detecting process in step S220.

Upon determining that no target persons are detected (NO in step S240), the processor 60 stores a result of the determination indicative of "undazzling" in the RAM or the like, terminating the dazzling detecting subroutine and returning to the main routine in step S330.

Otherwise, upon determining that a target person is detected (YES in step S240), the processor 60 obtains one of the driver undazzled-area maps when the detected target person is the driver of the target vehicle or obtains one of the passer-by undazzled-area maps when the detected target person is the target passer-by. The obtained driver or passer-by undazzled-area map corresponds to the actual irradiation state of the headlights 30, such as the high-beam state of the headlights 30 in steps S250 and S260.

Next, the processor 60 extracts, as a first boundary distance, a boundary distance associated with a divided section corresponding to the detected location of the target person from the obtained driver or passer-by undazzled-area map in step S270. Then, in step S270, the processor 60 compares the first boundary distance with the actually measured distance between the reference vehicle and the target person.

Upon determining that the first boundary distance is equal to or lower than the actually measured distance (NO in step S270), the processor 60 stores a result of the determination indicative of "undazzling" in the RAM or the like, terminating the dazzling detecting subroutine and returning the main routine in step S330. In step S330, if the result of the determination indicative of "dazzling" has been stored in the RAM or the like, the processor 60 overwrites the determination indicative of "undazzling" in the RAM or the like.

Otherwise, upon determining that the first boundary distance is greater than the actually measured distance (YES in step S270), the processor 60 stores a result of the determination indicative of "dazzling" in the RAM or the like in step S280, terminating the dazzling detecting subroutine and returning the main routine. In step S280, if the result of the determination indicative of "undazzling" has been stored in the RAM or the like, the processor 60 overwrites the determination indicative of "dazzling" in the RAM or the like.

Returning to the main routine, the processor 60 determines whether the result of the determination indicative of "dazzling" is stored in the RAM or the like in step S120.

Upon determining that the result of the determination indicative of "dazzling" is not stored in the RAM or the like (NO in step S120), the processor 60 terminates the headlight control routine. Specifically, when it is determined that the high-beam irradiated from the headlights 30 does not dazzle the target person, the high-beam state is maintained.

Otherwise, upon determining that the result of the determination indicative of "dazzling" is stored in the RAM or the like (YES in step S120), the processor 60 carries out a first light-quantity changing process to reduce the glare for the target person in step S140.

The first light-quantity changing process is to reduce the quantity of light by the headlights 30 at the detected location of the target person or change an area to be irradiated by the light beams of the headlights 30.

Figure 14A:
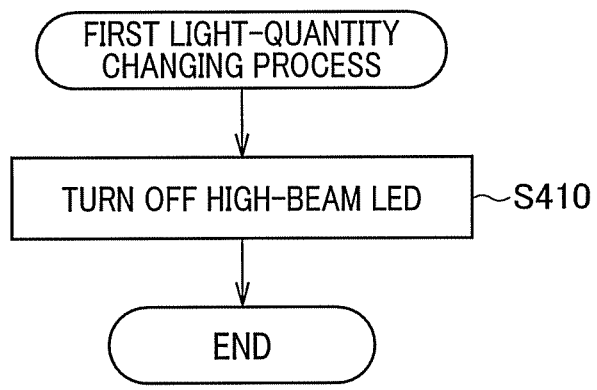
FIG. 14A is a flowchart schematically illustrating a first light-quantity changing process (subroutine) of the headlight control routine.

For example, in the second embodiment, as illustrated in FIG. 14A, the processor 60 instructs the controller 71 for each headlight 30 to turn off all of the corresponding high-beam LEDs 31 in step S410. That is, the first light-quantity changing process reduces the overall light quantity, and especially, deactivates all of the high-beam LEDs 31. This allows the optical axis of each headlight 30 to be dimmed (dipped) from the height of the eye-point of the target person, making it possible to reduce the level of glare for the target person.

After completion of the first light-quantity changing process, the processor 60 terminates the headlight control routine.

As described above, the headlight control system 51 according to the second embodiment is configured to:

detect that the headlights 30 dazzle a target person; and reduce the quantity of light by the headlights 30 or change an area to be irradiated by the light beams of the headlights 30 so as to reduce the quantity of light at the detected location of the target person.

In addition, in the determination process, the headlight control system 51 is configured to:

extract, as the first boundary distance, a boundary distance associated with a divided section corresponding to the detected location of the target person from the obtained driver or passerby undazzled-area map;

compare the first boundary distance with the actually measured distance between the reference vehicle and the target person; and determine that the headlights 30 dazzle the target person when it is determined that the first boundary distance is greater than the actually measured distance.

Each of the undazzled-area maps stored in the data storage unit 61 means information indicative of a relationship between a boundary distance and each of the divided sections of the rectangular area to be picked up as an image by the front camera 65 of the reference vehicle. The boundary distance means a maximum distance between the reference vehicle and a target person such that, when the distance between the reference vehicle and the target person is within the maximum distance, the target person is estimated to be dazzled by the headlights 30 of the reference vehicle.

With the structure of the headlight control system 51, comparison of the actually measured distance between the reference vehicle and a target person with the boundary distance based on a corresponding undazzled-area map determines whether the headlights 30 dazzle the target person. Thus, the determination of whether the headlights 30 dazzle the target person can be simply carried out. For this reason, the determination of whether the headlights 30 dazzle the target person can be carried out in real time.

When it is determined that the headlights 30 dazzle the target person, reduction of the light quantity at the detected location of the target person allows the level of glare for the target person to be reduced.

Each of the undazzled-area maps to be used by the headlight control system 51 is calculated when the eye-point of the target person is assumed to be located in each of the divided sections.

When it is determined that the evaluation values W corresponding to a maximum distance and calculated by inputting the calculated illuminations $E_{B1}, E_{B2}, E_{B3}, E_{B4}$, and the calculated elevation angles $\alpha1$ to $\alpha4$ and yaw angles $\beta1$ to $\beta4$ to the Schmidt-Clausen and Bindels equation [1] is less than a preset threshold, such as the rating of 4, the maximum distance is determined as the boundary distance.

Specifically, use of the Schmidt-Clausen and Bindels equation [1] can logically determine the boundary distance with high accuracy.

Third Embodiment

A headlight control system to which the present invention is applied according to the third embodiment thereof will be described hereinafter with reference to FIGS. 14 to 16.

Like parts between the headlight control systems according to the second and third embodiments, to which like reference characters are assigned, are omitted or simplified in description.

The controller 71 of each headlight 30 is configured to activate or deactivate only part, such as the half, of the high-beam LEDs 31. The plurality of types of undazzled-area maps for each of the driver of the target vehicle or the target person include:

a first undazzled-area map produced when all of the high-beam and low-beam LEDs 31 and 33 are on state, and a second undazzled-area map produced when the part of the high-beam LEDs 31 and all low-beam LEDs 33 are on state.

Specifically, the second undazzled-area map is produced based on the light distribution data different from the light distribution data used to produce the first undazzled-area map.

The light control allows only the part of the high-beam LEDs 31 to be turned on and off.

Next, operations of the headlight control system according to the third embodiment for reducing the level of glare for a target person will be described hereinafter. A headlight control routine to be executed by the processor 60 will be described hereinafter with reference to FIG. 15.

The headlight control routine is repeatedly carried out by the processor 60 while at least part of the high-beam LEDs 31 are in the on state.

When starting the headlight control routine, the processor 60 runs a dazzling detecting subroutine in step S110.

Next, the dazzling detecting subroutine in step S110 will be fully described hereinafter with reference to FIG. 16.

Figure 13:
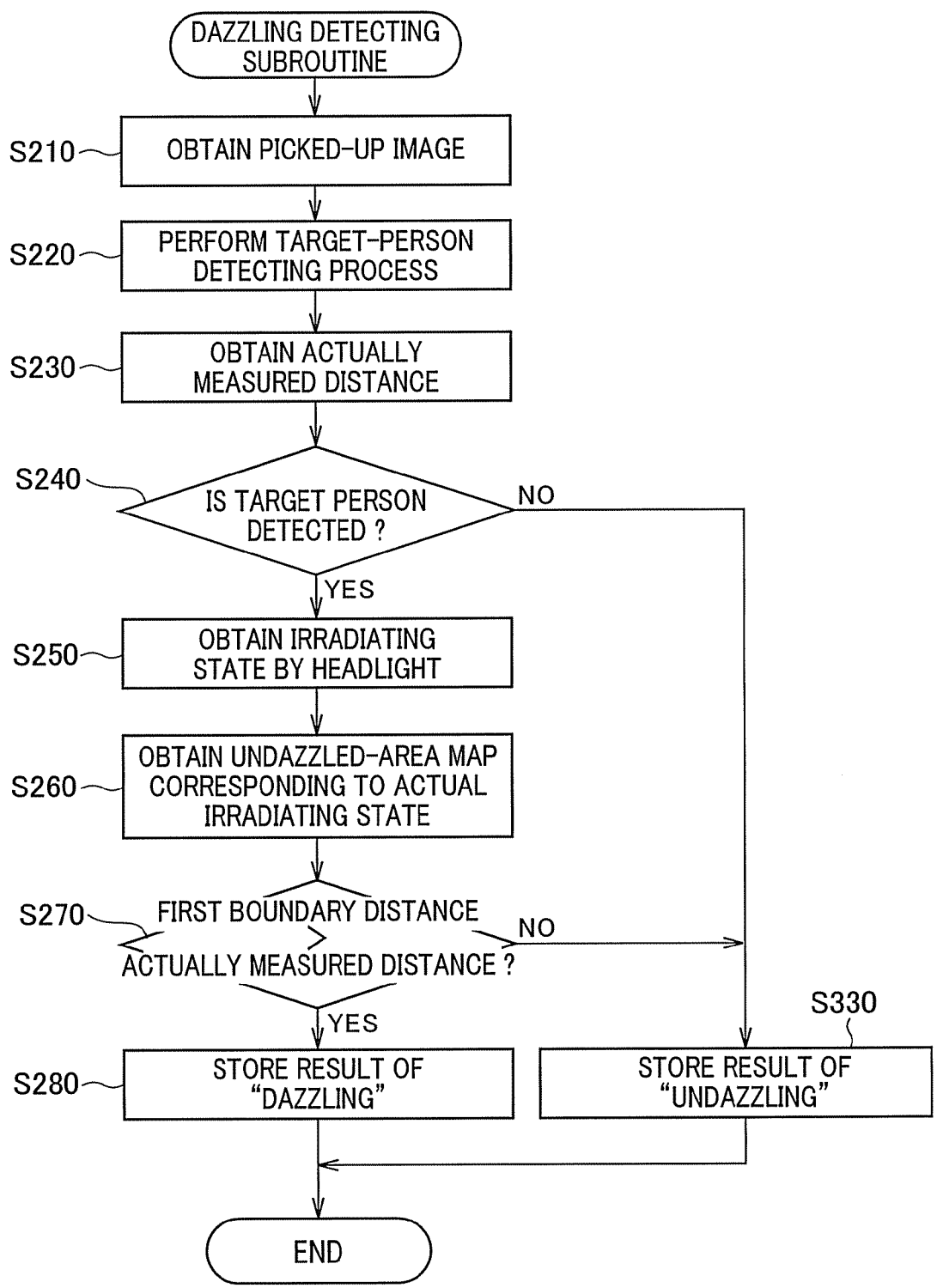
FIG. 13 is a flowchart schematically illustrating a dazzling detecting subroutine of the headlight control routine illustrated in FIG. 12.

When running the dazzling detecting subroutine, the processor 60 carries out the processes in steps S210 to S280 illustrated in FIG. 13.

Specifically, when storing a result of the determination indicative of "dazzling" in the RAM or the like in step S280, the processor 60 determines whether the part of the high-beam LEDs 31 in off state in step S290.

Upon determining that the part of the high-beam LEDs 31 is in off state (YES in step S290), the processor 60 stores, in the RAM or the like, information (not effective information) representing that the change of the irradiation state with the part of the high-beam LEDs 31 being on is not effective in step S340, terminating the dazzling detecting subroutine and returning the main routine.

Otherwise, upon determining that all of the high-beam LEDs 31 are in on state (NO in step S290), the processor 60 obtains the second undazzled area map corresponding to the part of the high-beam LEDs 31 being on and to the detected target person in step S300.

Next, the processor 60 extracts, as a second boundary distance, a boundary distance associated with a divided section corresponding to the detected location of the target person from the obtained second undazzled-area map in step S310. Then, in step S310, the processor 60 compares the second boundary distance with a first boundary distance associated with the divided section corresponding to the detected location of the target person from the first undazzled-area map in step S310.

Upon determining that the second boundary distance is greater than the first boundary distance (YES in step S310), the processor 60 stores information (effective information) representing that the change of the irradiation state with the part of the high-beam LEDs 31 being on is effective in step S320, terminating the dazzling detecting subroutine and returning the main routine. In step S320, if the not effective information has been stored in the RAM or the like, the processor 60 overwrites the effective information in the RAM or the like.

Otherwise, upon determining that the second boundary distance is equal to or lower than the first boundary distance (NO in step S310), the processor 60 stores information (not effective information) representing that the change of the irradiation state with the part of the high-beam LEDs 31 being on is not effective in step S340, terminating the dazzling detecting subroutine and returning the main routine. In step S340, if the effective information has been stored in the RAM or the like, the processor 60 overwrites the not effective information in the RAM or the like.

Returning to the main routine, the processor 60 determines whether the result of the determination indicative of "dazzling" is stored in the RAM or the like.

Upon determining that the result of the determination indicative of "dazzling" is stored in the RAM or the like (YES in step S120), the processor 60 determines whether the effective information or the not effective information is stored in the RAM or the like in step S130.

Upon determining that the not effective information is stored in the RAM or the like (NO in step S130), the processor 60 carries out the first light-quantity changing process in step S140.

Otherwise, upon determining that the effective information is stored in the RAM or the like (YES in step S130), the processor 60 carries out the second light-quantity changing process in step S150.

Figure 14B:
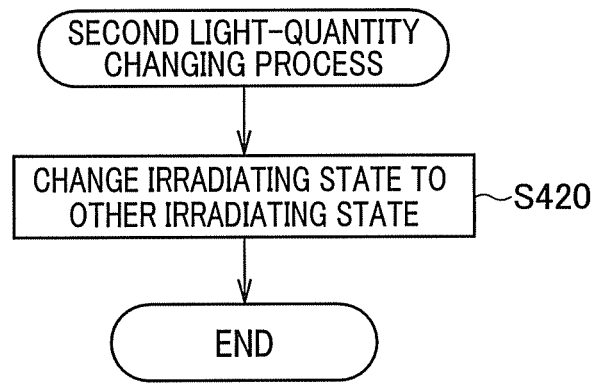
FIG. 14B is a flowchart schematically illustrating a second light-quantity changing process (subroutine) of a headlight control routine illustrated in FIG. 15.
Figure 15:
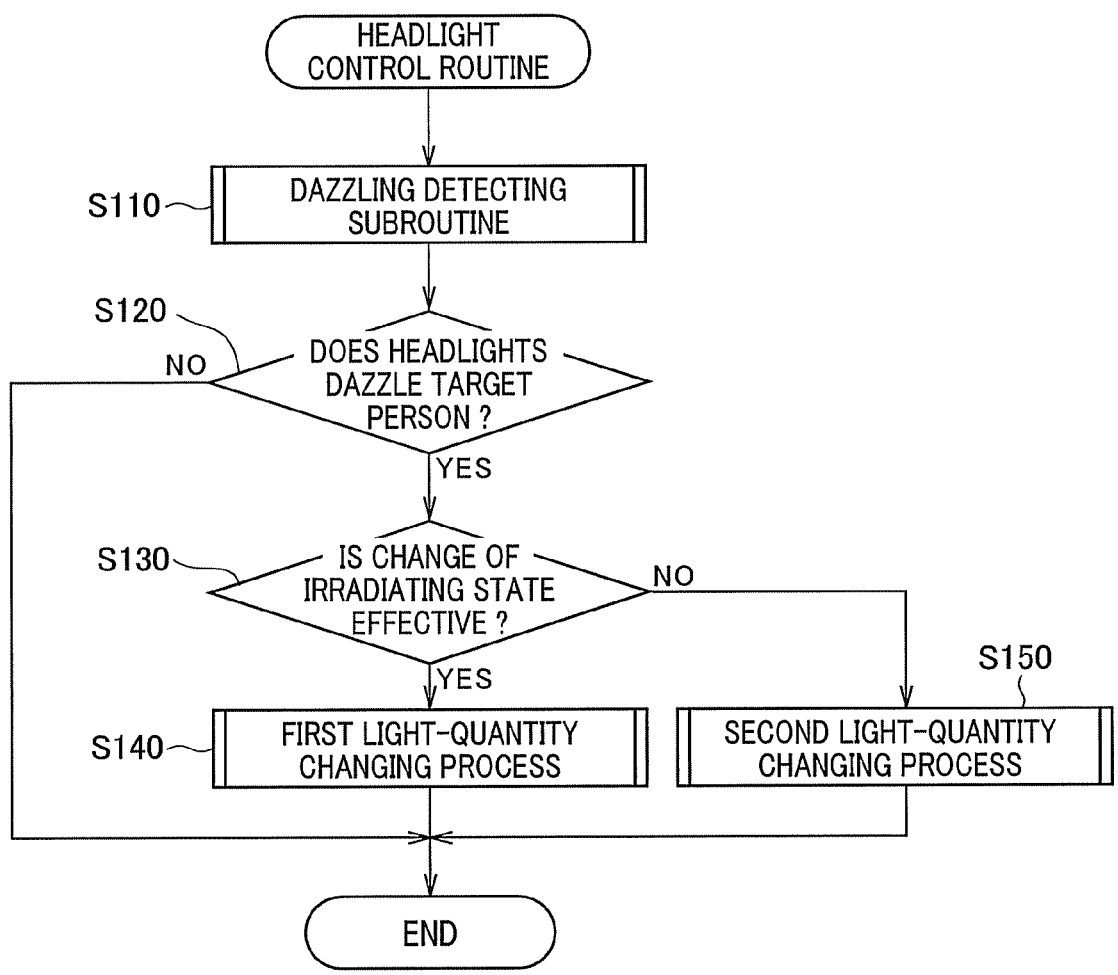
FIG. 15 is a flowchart schematically illustrating the headlight control routine to be executed by a processor of a headlight control system according to the third embodiment of the present invention.

For example, in the third embodiment, as illustrated in FIG. 14B, the processor 60 instructs the controller 71 for each headlight 30 to control the high-beam and low-beam LEDs 31 and 33 to thereby change the actual irradiating state to an other irradiating state by the headlights 30 in step S420. The other irradiating state corresponds to only part of the high-beam LEDs 31 being in the on state.

After completion of the second light-quantity changing process, the processor 60 terminates the headlight control routine.

As described above, the headlight control system according to the third embodiment is configured to:

determine whether the headlights 30 dazzle a target person;

determine whether change of the actual irradiating state by the headlights 30 to the other irradiating state thereby reduces the level of glare for the target person; and change the actual irradiating state by the headlights 30 to the other irradiating state when it is determined that the headlights 30 dazzle the target person, and change of the actual irradiating state by the headlights 30 to the other irradiating state thereby reduces the level of glare for the target person.

In addition, the headlight control system is configured to reference the second undazzled-area map to thereby extract the second boundary distance corresponding to the location of the target person. The headlight control system is configured to compare the second boundary distance with the first boundary distance, and to instruct the controller 71 to change the actual irradiating state to the other irradiating state by the headlights 30 when it is determined that the second boundary distance is greater than the first boundary distance.

Thus, the headlight control system can determine whether change of the actual irradiating state by the headlights 30 to the other irradiating state thereby reduces the level of glare for the target person. This allows examination of whether change of the actual irradiating state by the headlights 30 to the other irradiating state thereby is effective before actually changing the actual irradiating state by the headlights 30 to the other irradiating state.

In addition, the headlight control system is configured to change the actual irradiating state by the headlights 30 to the other irradiating state only when it is determined that the change reduces the level of glare for the target person. This prevents the irradiating state by the headlights 30 from not effectively being changed.

The present invention is not limited to the aforementioned embodiments, and therefore, various modifications and deformations can be made within the scope of the present invention.

The plurality of types of undazzled-area maps for either the driver of the target vehicle or the target person can include a third undazzled-area map produced when all low-beam LEDs 33 are only on state.

In this modification, in step S290, upon determining that the part of the high-beam LEDs 31 is in off state (YES in step S290), the processor 60 obtains the third undazzled area map corresponding to the detected target person like in the same manner as step S300.

Next, the processor 60 extracts, as a third boundary distance, a boundary distance associated with a divided section corresponding to the detected location of the target person from the obtained third undazzled-area map. Then, the processor 60 compares the third boundary distance with a second boundary distance associated with the divided section corresponding to the detected location of the target person from the first undazzled-area map in the same manner as step S310.

Upon determining that the third boundary distance is greater than the second boundary distance, the processor 60 stores information (effective information) representing that the change of the irradiation state with all of the low-beam LEDs 33 being on is effective in the same manner as step S320, terminating the dazzling detecting subroutine and returning the main routine.

Otherwise, upon determining that the third boundary distance is equal to or lower than the second boundary distance, the processor 60 stores information (not effective information) representing that the change of the irradiation state with all of the low-beam LEDs 33 being on is not effective in the same manner as step S340, terminating the dazzling detecting subroutine and returning the main routine.

Thereafter, in the main routine, when it is determined that the result of the determination indicative of "dazzling" is stored in the RAM or the like, and the not effective information is stored in the RAM or the like, the processor 60 can instruct the controller 71 for each headlight 30 to maintain the low-beam irradiating state.

Undazzled-area maps can be produced respectively for the optical axis of the headlights in the vertical direction and for the optical axis of the headlights in the horizontal direction.

In other words, a plurality of the second undazzled-area maps can be prepared. In this modification, in steps S300 to S310, the processor can select one of the second undazzled-area maps such that the second boundary distance corresponding to the location of the target person is greater than the first boundary distance.

In this modification, the processor need not compare the second boundary distances of all of the second-undazzled area maps with the first boundary distance, can sequentially compare the second distances of the second-undazzled area maps with the first boundary distance, and determine one of the second-undazzled area maps at the time when the corresponding second distance is greater than the first distance.

In addition, when carrying out the comparison, the processor can select some of the second-undazzled area maps whose the second boundary distances corresponding to the location of the target person are equal to or greater than the actually measured distance and close thereto.

The modification can prevent the target person from being dazzled while maximally ensuring the view of the driver of the reference vehicle. In particular, when a pedestrian is detected as the target person, it is possible to irradiate the light beam from the headlights 30 without dazzling the pedestrian, making it easier to visibly recognize the pedestrian. Thus, the safety of the reference vehicle can be enhanced.

The various types of undazzled-area maps can include undazzled-area maps produced every time the quantity of light to be irradiated from at least one of the headlights 30 is changed.

The various types of undazzled-area maps can also include undazzled-area maps produced when a part of the high- and low-beam LEDs 31 and 33 is of state. In this modification, the light quantity to be irradiated from at least one of the headlights 30 can be reduced according to the location of the target person. Undazzled-area maps according to types of weather, such as rainy weather or dense fog, can be prepared.

In at least some of the aforementioned embodiments, the result of determination of whether the headlights 30 dazzle a target person is used to control the headlights 30, but can be used to control the reference vehicle. Specifically, the distance between the reference vehicle and the preceding vehicle can be controlled according to the result of determination of whether the headlights 30 dazzle the driver of the preceding vehicle to thereby maintain the distance between the reference vehicle and the preceding vehicle that prevents the driver of the preceding vehicle from being dazzled.

The result of determination of whether the headlights 30 dazzle a target vehicle can be transmitted to the target vehicle via communication means, such as vehicle-to-vehicle communication means. This allows the driver of the target vehicle to prevent dazzling due to the headlights 30 of the reference vehicle.

In at least some of the aforementioned embodiments, after the evaluation values W have been calculated for all of the previously prepared inter-vehicle distances, the processor extracts, as a boundary distance, a maximum inter-vehicle distance from all of the previously prepared inter-vehicle distances; the evaluation value W corresponding to the extracted maximum inter-vehicle distance is less than the rating of 4. The present invention is however not limited to the operations.

Specifically, the processor can calculate the evaluation value W while sequentially selecting any one of the previously prepared inter-vehicle distances in ascending order (from the shortest inter-vehicle distance to the longest inter-vehicle distance), and, every time the evaluation value W is calculated, determine whether the calculated evaluation value W is less than the rating of 4.

In this modification, at the moment when it is determined that the actually calculated evaluation value W is less than the rating of 4 upon any one of the previously prepared inter-vehicle distances is selected, the processor can recognize the actually selected inter-vehicle distance as the boundary distance, and omit the calculation of the evaluation values W based on the remaining prepared inter-vehicle distances.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A dazzling determining system installed in a vehicle to be controlled for determining whether a headlight of the controlled vehicle dazzles a target person, a pickup unit being installed in the controlled vehicle and configured to pick up a rectangular image ahead of the controlled vehicle, the dazzling determining system comprising:
   an extracting unit working to extract a location of the target person in the rectangular image picked up by the pickup unit;
   a distance measuring unit working to actually measure a distance between the controlled vehicle and the target person;
   a first undazzled-area map storage unit working to store therein a first undazzled-area map, the first undazzled-area map including information indicative of a relationship between a boundary distance and each of a plurality of divided sections of the rectangular image, the boundary distance being defined as a maximum distance between the controlled vehicle and the target person such that, when the actually measured distance between the controlled vehicle and the target person is within the maximum distance, the target person is estimated to be dazzled by the headlight of the controlled vehicle;
   a first boundary distance extracting unit working to reference the first undazzled-area map to thereby extract, as a first boundary distance, the boundary distance corresponding to one of the plurality of divided sections, the one of the plurality of divided sections corresponding to the location of the target person; and
   a dazzling determining unit working to compare the first boundary distance with the actually measured distance to thereby determine that the headlight of the controlled vehicle is estimated to dazzle the target person when the actually measured distance is equal to or lower than the first boundary distance.

2. The dazzling determining system according to claim 1, wherein the boundary distance for each of the plurality of divided sections in the first undazzled-area map represents the maximum distance between the controlled vehicle and the target person, an evaluation value, which corresponds to the maximum distance, being less than a preset threshold value, the evaluation value indicative of a level of glare perceived by the target person being calculated by inputting, into a Schmidt-Clausen and Bindels equation, an angle and an illumination when an eye-point of the target person is assumed to be located at each of the plurality of divided sections, the angle being formed between a line of sight of the target person and an optical axis of the headlight of the controlled vehicle, the illumination being directed toward the eye-point of the target person from the headlight of the controlled vehicle.

3. The dazzling determining system according to claim 1, wherein the boundary distance for each of the plurality of divided sections in the first undazzled-area map storage unit corresponds to a predetermined first irradiating state by the headlight of the controlled vehicle, further comprising:
   a second undazzled-area map storage unit working to store therein a second undazzled-area map, the second undazzled-area map including information indicative of a relationship between a boundary distance and each of the plurality of divided sections of the rectangular image, the boundary distance being defined as a maximum distance between the controlled vehicle and the target person with the headlight of the controlled vehicle having a second irradiating state such that, when the actually measured distance between the controlled vehicle and the target person is within the maximum distance, the target person is estimated to be dazzled by the headlight of the controlled vehicle, the second irradiating state being different from the first irradiating state;

a second boundary distance extracting unit working to, when the headlight of the controlled vehicle is assumed to be changed from the first irradiating state as an actual irradiating state to the second irradiating state, reference the second undazzled-area map to thereby extract, as a second boundary distance, the boundary distance corresponding to one of the plurality of divided sections, the one of the plurality of divided sections corresponding to the location of the target person; and a changing unit working to compare the second boundary distance with the first boundary distance to thereby change the actual irradiating state of the headlight from the first irradiating state to the second irradiating state when the second boundary distance is greater than the first boundary distance.

4. A system for controlling a headlight of a vehicle to be controlled, the system comprising:

the dazzling determining system according to claim 1; and an adjuster configured to adjust at least one of a light quantity and an light irradiating region of the headlight so as to reduce a light quantity at the location of the target person when it is determined that the headlight of the controlled vehicle is estimated to dazzle the target person by the dazzling determining system.

5. A system for controlling a headlight of a vehicle to be controlled, the system comprising:

the dazzling determining system according to claim 1, the dazzling determining system working to, when it is determined that the headlight of the controlled vehicle dazzles the target person, determine whether change of an actual irradiating state of the headlight of the controlled vehicle to an alternative irradiating state thereof reduces the level of glare for the target person; and an adjuster configured to adjust the actual irradiating state of the headlight to the alternative irradiating state when it is determined that change of the actual irradiating state of the headlight of the controlled vehicle to the alternative irradiating state thereof reduces the level of glare for the target person.

6. The dazzling determining system according to claim 1, wherein the target person is a driver of a target vehicle in front of the controlled vehicle, and the first undazzled-area map is designed to be produced by the following steps of:

(a) setting one of the plurality of divided sections as a target section and one of a plurality of preset inter-vehicle distances between the controlled vehicle and the driver of the target vehicle as a specified inter-vehicle distance;

(b) calculating an angle formed between a line of sight of the driver of the target vehicle and an optical axis of the headlight of the controlled vehicle when an eye-point of the driver of the target vehicle is assumed to be located at the target section and the target vehicle is assumed to be located in the specified inter-vehicle distance from the controlled vehicle;

(c) calculating an illumination directed toward the eye-point of the driver of the target vehicle from the headlight of the controlled vehicle;

(d) calculating, based on the calculated angle and illumination, an evaluation value indicative of a level of glare perceived by the driver of the target vehicle in accordance with a Schmidt-Clausen and Bindels equation while each of the plurality of preset inter-vehicle distances is sequentially selected as the specified inter-vehicle distance;

(e) extracting, as the boundary distance for the target section, a maximum inter-vehicle distance from the plurality of preset inter-vehicle distances, the evaluation value, which corresponds to the extracted maximum inter-vehicle distance, being less than a preset threshold value;

(f) repeatedly carrying out the steps (a) to (e) while changing selection of one of the plurality of divided sections as the target section until the boundary distance is extracted for each of the plurality of divided sections; and (g) producing the first undazzled-area map by associating the boundary distance for each of the plurality of divided sections with a corresponding one of the plurality of divided sections.

7. The dazzling determining system according to claim 1, wherein the target person is a driver of a target vehicle in front of the controlled vehicle, further comprising a map producing system for producing the first undazzled-area map, the map producing system comprising:

an input unit configured to input a plurality of parameters, the plurality of parameters defining a positional relationship between an eye-point of the driver of the target vehicle and the headlight of the controlled vehicle;

a storing unit configured to store therein light-distribution data for the headlight of the controlled vehicle, the light-distribution data representing a location of the headlight in a three-dimensional space and an illumination of the headlight at the location;

when one of the plurality of divided sections is set as a target section, one of a plurality of preset inter-vehicle distances between the controlled vehicle and the target vehicle is set as a specified inter-vehicle distance, and the eye-point of the driver of the target vehicle is assumed to be located in the target section and the target vehicle is assumed to be located at the specified inter-vehicle distance from the controlled vehicle, a calculating unit configured to:

calculate an angle formed between a line of sight of the drier of the target vehicle and an optical axis of the headlight of the controlled vehicle;

calculate an illumination directed toward the eye-point of the driver of the target vehicle from the headlight of the controlled vehicle;

calculate, based on the calculated angle and illumination, an evaluation value indicative of a level of glare perceived by the driver of the target vehicle in accordance with a Schmidt-Clausen and Bindels equation while each of the plurality of preset inter-vehicle distances is sequentially selected as the specified inter-vehicle distance; and extract, as the boundary distance for the target section, a maximum inter-vehicle distance from the plurality of preset inter-vehicle distances, the evaluation value, which corresponds to the extracted maximum inter-vehicle distance, being less than a preset threshold value;

an executing unit configured to cause the calculating unit to repeatedly execute the calculations and the extraction while changing selection of one of the plurality of divided sections as the target section until the boundary distance is extracted for each of the plurality of divided sections; and a producing unit configured to produce the undazzled-area map by associating the boundary distance for each of the plurality of divided sections with each of the plurality of divided sections.

8. The map producing system according to claim 7, wherein the headlight consists of a pair of headlights, the paired headlights are located on respective sides of a front end of the controlled vehicle, the pickup unit is located on the front end of the controlled vehicle, and the plurality of parameters inputted from the input unit include:
  a height of each of the headlights of the controlled vehicle located on each side of the front end of the controlled vehicle from a reference plane,
  an interval between the paired headlights; and
  a height of the camera located on the front end of the controlled vehicle.

9. The map producing system according to claim 7, wherein the headlight is made up of a plurality of pairs of headlamps, and the calculating unit is configured to use, as the illuminance directed toward the eye-point of the driver of the target vehicle from the headlight of the controlled vehicle, the sum of the illuminations directed toward the eye-point of the driver of the target vehicle from the respective headlamps of the controlled vehicle.

10. The map producing system according to claim 7 wherein the controlled vehicle has a windshield, and the calculating unit is configured to calculate the illumination directed toward the eye-point of the driver of the target vehicle from the headlight of the controlled vehicle in consideration of a light transmission of the windshield.

* * * * *